United States Patent
Al-Yousef et al.

(10) Patent No.: US 11,881,094 B2
(45) Date of Patent: Jan. 23, 2024

(54) INFRASTRUCTURE CONSTRUCTION DIGITAL INTEGRATED TWIN (ICDIT)

(71) Applicant: Saudi Arabian Oil Company, Dhahran (SA)

(72) Inventors: Bander R. Al-Yousef, Al Mubarraz (SA); Soloman M. Almadi, Dhahran (SA); Abdullah Fayez Al-Halafi, Dammam (SA); Abdulaziz Khaled AlSenaide, Riyadh (SA); Fouad Alkhabbaz, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/728,184

(22) Filed: Apr. 25, 2022

(65) Prior Publication Data
US 2022/0246012 A1 Aug. 4, 2022

Related U.S. Application Data

(63) Continuation of application No. 16/987,076, filed on Aug. 6, 2020, now Pat. No. 11,341,830.

(51) Int. Cl.
*G08B 21/00* (2006.01)
*G08B 21/02* (2006.01)

(52) U.S. Cl.
CPC ................ *G08B 21/02* (2013.01)

(58) Field of Classification Search
CPC .......... G08B 21/02; G05B 2219/24012; G05B 2219/24021; G05B 2219/24024;
(Continued)

(56) References Cited

U.S. PATENT DOCUMENTS 3,104,549 A 9/1963 Humbert et al.
3,316,767 A 5/1967 Liebert
(Continued)

FOREIGN PATENT DOCUMENTS

CN 102520388 6/2012
CN 203322437 12/2013
(Continued)

OTHER PUBLICATIONS

Almadi, "Intelligent Field Infrastructure Adoption: Approach and Best Practices," SPE 150066, Society of Petroleum Engineers (SPE), presented at the SPE intelligent Energy International Conference, Mar. 27-29, 2012, 12 pages.
(Continued)

*Primary Examiner* — Tai T Nguyen
(74) *Attorney, Agent, or Firm* — Fish & Richardson P.C.

(57) ABSTRACT

The present disclosure describes a computer-implemented method to manage an industrial plant facility, the method including: monitoring multiple streams of input data from a network of sensors at the industrial plant facility, wherein the network of sensors include one or more camera devices; determining, by a server computer, an event during construction or operation of the industrial plant facility based on analyzing the multiple streams of input data in real-time; and based on the determined event, generating a notification to alert at least one operator of the industrial plant facility.

20 Claims, 16 Drawing Sheets

(58) Field of Classification Search
CPC ...... G05B 2219/24097; G05B 23/0221; G05B 23/0267
USPC ........................................................ 340/540
See application file for complete search history.

(56) References Cited

U.S. PATENT DOCUMENTS

| | | |
|---|---|---|
| 3,373,608 A | 3/1968 | Ketelsen |
| 4,051,723 A | 10/1977 | Head et al. |
| RE31,186 E | 3/1983 | Rosenweig |
| 4,517,846 A | 5/1985 | Harrison et al. |
| 4,757,314 A | 7/1988 | Aubin |
| 4,777,833 A | 10/1988 | Carpenter |
| 4,901,018 A | 2/1990 | Lew |
| 4,965,996 A | 9/1990 | Morris |
| 5,067,345 A | 11/1991 | Mougne |
| 5,090,250 A | 2/1992 | Wada |
| 5,164,897 A | 11/1992 | Clark |
| 5,259,239 A | 11/1993 | Gaisford |
| 5,392,648 A | 2/1995 | Robertson |
| 5,417,118 A | 5/1995 | Lew et al. |
| 5,586,310 A | 12/1996 | Sharman |
| 5,975,204 A | 11/1999 | Tubel et al. |
| 6,006,831 A | 12/1999 | Schlemmer et al. |
| 6,046,685 A | 4/2000 | Tubel |
| 6,085,599 A | 7/2000 | Feller |
| 6,106,032 A | 8/2000 | Och |
| 6,163,257 A | 12/2000 | Tracy |
| 6,237,424 B1 | 5/2001 | Salmasi et al. |
| 6,356,844 B2 | 3/2002 | Thomas et al. |
| 6,463,807 B1 | 10/2002 | Feller |
| 6,626,048 B1 | 8/2003 | Dam Es et al. |
| 6,747,372 B2 | 6/2004 | Gilbreth et al. |
| 6,882,904 B1 | 4/2005 | Petrie et al. |
| 6,920,799 B1 | 7/2005 | Schulz |
| 6,950,825 B2 | 9/2005 | Chang et al. |
| 7,015,800 B2 | 3/2006 | Lesesky et al. |
| 7,259,688 B2 | 8/2007 | Hirsch et al. |
| 7,265,544 B2 | 9/2007 | Keese |
| 7,469,188 B2 | 12/2008 | Wee |
| 7,478,024 B2 | 1/2009 | Gurpinar et al. |
| 7,493,140 B2 | 2/2009 | Michmerhuizen et al. |
| 7,536,547 B2 | 5/2009 | Van Den Tillaart |
| 7,540,202 B2 | 6/2009 | Bier |
| 7,557,701 B2 | 7/2009 | Nunnazaki |
| 7,574,907 B2 | 8/2009 | Maute |
| 7,584,165 B2 | 9/2009 | Buchan |
| 7,644,290 B2 | 1/2010 | Ransom et al. |
| 7,653,936 B2 | 1/2010 | Oberst |
| 7,739,359 B1 | 6/2010 | Millet et al. |
| 7,828,065 B2 | 11/2010 | Ross |
| 7,933,989 B1 | 4/2011 | Barker et al. |
| 7,940,302 B2 | 5/2011 | Mehrotra et al. |
| 8,039,991 B2 | 10/2011 | Wakitani et al. |
| 8,051,722 B2 | 11/2011 | Voigt et al. |
| 8,102,238 B2 | 1/2012 | Golander et al. |
| 8,195,590 B1 | 6/2012 | Storek |
| 8,271,212 B2 | 9/2012 | Sai et al. |
| 8,280,635 B2 | 10/2012 | Ella et al. |
| 8,312,320 B2 | 11/2012 | Almadi |
| 8,323,392 B2 | 12/2012 | Jones et al. |
| 8,334,775 B2 | 12/2012 | Tapp et al. |
| 8,359,171 B2 | 1/2013 | Bleys et al. |
| 8,365,250 B2 | 1/2013 | Denny |
| 8,365,612 B2 | 2/2013 | Izumi |
| 8,543,716 B1 | 9/2013 | Rashidi |
| 8,667,091 B2 | 3/2014 | Almadi |
| 8,732,106 B1 | 5/2014 | Presgraves et al. |
| 8,750,513 B2 | 6/2014 | Renkis |
| 8,761,911 B1 | 6/2014 | Chapman et al. |
| 8,792,115 B2 | 7/2014 | Harano |
| 8,875,379 B2 | 11/2014 | Maute |
| 8,884,759 B2 | 11/2014 | Oktem et al. |
| 8,887,241 B2 | 11/2014 | Britton et al. |
| 8,972,742 B2 | 3/2015 | Troncoso Pastoriza et al. |
| 9,147,174 B2 | 9/2015 | Glickman et al. |
| 9,208,676 B2 | 12/2015 | Fadell et al. |
| 9,210,179 B2 | 12/2015 | Mevec et al. |
| 9,396,599 B1 | 7/2016 | Malhotra |
| 9,467,472 B2 | 10/2016 | Weiner et al. |
| 9,699,768 B2 | 7/2017 | Werb |
| 9,760,075 B2 | 9/2017 | Fisher-Rosemont |
| 10,330,511 B2 | 6/2019 | Alkhabbaz et al. |
| 10,462,884 B2 | 10/2019 | Jayawardena et al. |
| 10,514,415 B2 | 12/2019 | Jayawardena et al. |
| 10,551,047 B2 | 2/2020 | Treible, Jr. et al. |
| 11,341,830 B2 | 5/2022 | Al-Yousef et al. |
| 2002/0152053 A1 | 10/2002 | Roy et al. |
| 2003/0117298 A1 | 6/2003 | Seely |
| 2004/0045368 A1 | 3/2004 | Schoeb |
| 2004/0098592 A1 | 5/2004 | Taki |
| 2004/0188710 A1 | 9/2004 | Koren et al. |
| 2005/0015624 A1 | 1/2005 | Ginter et al. |
| 2005/0184084 A1 | 8/2005 | Wells |
| 2005/0193832 A1 | 9/2005 | Tombs et al. |
| 2005/0228683 A1 | 10/2005 | Saylor et al. |
| 2006/0032547 A1 | 2/2006 | Rossi |
| 2006/0085174 A1 | 4/2006 | Hemanthkumar |
| 2006/0086497 A1 | 4/2006 | Ohmer et al. |
| 2006/0107061 A1 | 5/2006 | Holovacs |
| 2007/0018009 A1 | 1/2007 | Choi et al. |
| 2007/0126576 A1 | 6/2007 | Script et al. |
| 2007/0163359 A1 | 7/2007 | Nielsen |
| 2007/0193834 A1 | 8/2007 | Pai |
| 2007/0198223 A1 | 8/2007 | Ella et al. |
| 2008/0061984 A1 | 3/2008 | Breed et al. |
| 2008/0109883 A1 | 5/2008 | Hernoud et al. |
| 2008/0109889 A1 | 5/2008 | Bartels et al. |
| 2008/0139195 A1 | 6/2008 | Marsyla et al. |
| 2008/0228908 A1 | 9/2008 | Link |
| 2008/0251260 A1 | 10/2008 | Ross et al. |
| 2008/0274766 A1 | 11/2008 | Pratt et al. |
| 2009/0012631 A1 | 1/2009 | Fuller |
| 2009/0037607 A1 | 2/2009 | Farinacci et al. |
| 2009/0089108 A1 | 4/2009 | Angell et al. |
| 2009/0138353 A1 | 5/2009 | Mendelson |
| 2009/0141896 A1 | 6/2009 | McCown |
| 2009/0170468 A1* | 7/2009 | Kane ..................... G01G 21/20 455/404.2 |
| 2009/0210081 A1 | 8/2009 | Sustaeta |
| 2009/0224930 A1 | 9/2009 | Burza |
| 2010/0097205 A1 | 4/2010 | Script |
| 2010/0228584 A1 | 9/2010 | Nash |
| 2010/0231410 A1 | 9/2010 | Seisenberger |
| 2010/0292857 A1 | 11/2010 | Bose et al. |
| 2011/0066454 A1 | 3/2011 | Rosauer et al. |
| 2011/0071963 A1 | 3/2011 | Piovesan et al. |
| 2011/0074551 A1 | 3/2011 | Higashionji |
| 2011/0136463 A1 | 6/2011 | Ebdon |
| 2011/0178977 A1 | 7/2011 | Drees |
| 2011/0181426 A1 | 7/2011 | Bucciero et al. |
| 2011/0288692 A1 | 11/2011 | Scott |
| 2011/0296377 A1 | 12/2011 | Morozov et al. |
| 2012/0022700 A1 | 1/2012 | Drees et al. |
| 2012/0059634 A1 | 3/2012 | Bouzarkouna |
| 2012/0060030 A1 | 3/2012 | Lamb |
| 2012/0063354 A1 | 3/2012 | Vanga et al. |
| 2012/0084400 A1 | 4/2012 | Almadi et al. |
| 2012/0162423 A1 | 6/2012 | Xiao |
| 2012/0172085 A1 | 7/2012 | Vuppu |
| 2012/0307051 A1 | 12/2012 | Welter |
| 2013/0085687 A1 | 4/2013 | Danov et al. |
| 2013/0086650 A1 | 4/2013 | Soundrapandian et al. |
| 2013/0088429 A1 | 4/2013 | Yang |
| 2013/0103749 A1 | 4/2013 | Weth et al. |
| 2013/0110411 A1 | 5/2013 | Black et al. |
| 2013/0136597 A1 | 5/2013 | Hansen et al. |
| 2013/0151020 A1 | 6/2013 | Manninen et al. |
| 2013/0162405 A1 | 6/2013 | Forster |
| 2013/0212259 A1 | 8/2013 | Rankov et al. |
| 2013/0247117 A1 | 9/2013 | Yamada |
| 2013/0282641 A1 | 10/2013 | Martin et al. |
| 2014/0019768 A1 | 1/2014 | Pineau et al. |
| 2014/0046863 A1 | 2/2014 | Gifford et al. |

(56) References Cited

U.S. PATENT DOCUMENTS

| | | |
|---|---|---|
| 2014/0089671 A1 | 3/2014 | Logue |
| 2014/0118239 A1 | 5/2014 | Phillips |
| 2014/0139681 A1 | 5/2014 | Jones, Jr. et al. |
| 2014/0150549 A1 | 6/2014 | Rieger et al. |
| 2014/0156584 A1 | 6/2014 | Motukuri et al. |
| 2014/0230057 A1 | 8/2014 | Berger |
| 2014/0240088 A1 | 8/2014 | Robinette |
| 2014/0254799 A1 | 9/2014 | Husted |
| 2014/0261791 A1 | 9/2014 | Grabau et al. |
| 2014/0280953 A1 | 9/2014 | Brzozowski et al. |
| 2014/0310059 A1 | 10/2014 | Ellis |
| 2014/0337086 A1 | 11/2014 | Asenjo et al. |
| 2014/0340222 A1 | 11/2014 | Thornton |
| 2014/0342373 A1 | 11/2014 | Viovy et al. |
| 2015/0074023 A1 | 3/2015 | Gu |
| 2015/0109104 A1 | 4/2015 | Fadell |
| 2015/0116111 A1 | 4/2015 | Foster |
| 2015/0137967 A1 | 5/2015 | Wedig |
| 2015/0152035 A1 | 6/2015 | Shin et al. |
| 2015/0195789 A1 | 7/2015 | Yoon |
| 2015/0220321 A1 | 8/2015 | Jung |
| 2016/0006745 A1 | 1/2016 | Furuichi |
| 2016/0047663 A1* | 2/2016 | Iyer .................... G01C 21/206 701/411 |
| 2016/0049064 A1* | 2/2016 | McNabb ............... G08B 17/06 340/540 |
| 2016/0100437 A1 | 4/2016 | Amstrong et al. |
| 2016/0123111 A1 | 5/2016 | Kim |
| 2016/0206136 A1 | 7/2016 | Storek |
| 2016/0234239 A1 | 8/2016 | Knapp et al. |
| 2016/0259637 A1 | 9/2016 | Kumar |
| 2016/0259647 A1 | 9/2016 | Kim et al. |
| 2016/0379211 A1 | 12/2016 | Hoyos |
| 2017/0031840 A1 | 2/2017 | Cawse et al. |
| 2017/0034193 A1 | 2/2017 | Schulman et al. |
| 2017/0053224 A1 | 2/2017 | Duca et al. |
| 2017/0061715 A1 | 3/2017 | Busch-Sorensen |
| 2017/0184659 A1 | 6/2017 | Jayawardena et al. |
| 2017/0284191 A1 | 10/2017 | Martin |
| 2017/0289812 A1 | 10/2017 | Werb |
| 2017/0353491 A1 | 12/2017 | Gukal |
| 2017/0356780 A1 | 12/2017 | Smith et al. |
| 2018/0092331 A1 | 4/2018 | Zuidhof |
| 2018/0156437 A1 | 6/2018 | Freer et al. |
| 2019/0149894 A1 | 5/2019 | Weatherhead et al. |
| 2019/0159322 A1 | 5/2019 | Jayawardena et al. |
| 2019/0234603 A1 | 8/2019 | Treible, Jr. et al. |
| 2019/0295207 A1* | 9/2019 | Day .................... G08B 21/02 |
| 2019/0318170 A1 | 10/2019 | Rokade et al. |
| 2019/0340909 A1 | 11/2019 | Nguyen et al. |
| 2021/0014308 A1 | 1/2021 | Larsson |
| 2021/0084436 A1 | 3/2021 | Sutherland |
| 2021/0158664 A1* | 5/2021 | Correnti ................ G08B 25/10 |
| 2022/0044538 A1 | 2/2022 | Al-Yousef et al. |
| 2022/0270196 A1* | 8/2022 | Mathews ............ G06Q 50/265 |

FOREIGN PATENT DOCUMENTS

| | | | | |
|---|---|---|---|---|
| CN | 205862806 | * | 4/2017 | ............. Y02E 30/00 |
| EP | 0770856 | | 9/2003 | |
| EP | 1612741 | | 1/2006 | |
| EP | 1832548 | | 12/2007 | |
| EP | 2396273 | | 12/2011 | |
| EP | 3196716 | | 7/2017 | |
| GB | 1493527 | | 11/1977 | |
| GB | 2580470 | | 7/2020 | |
| JP | H 07152789 | | 6/1995 | |
| JP | 2014119266 | | 6/2014 | |
| WO | WO 2009000283 | | 12/2008 | |
| WO | WO 2015058134 | | 4/2015 | |
| WO | WO 2016073267 | | 5/2016 | |
| WO | WO 2016097998 | | 6/2016 | |
| WO | WO 2018207123 | | 11/2018 | |
| WO | WO 2019211764 | | 11/2019 | |

OTHER PUBLICATIONS

Boman, "IoT Technology to Reduce Need for Oil, Gas Workers Offshore," Oct. 14, 2016, rigzone.com (online), retrieved from URL <https://www.rigzone.com/news/oil_gas/a/147044/iot_technology_to_reduce_need_for_oil_gas_workers_offshore/>, 5 pages.

Canaz, "Planar and Linear Feature-Based Registration of Terrestrial Laser Scans with Minimum Overlap Using Photogrammetric Data," Masters Thesis, University of Calgary, Dec. 2012, 142 pages.

Cohen, "Reducing Business Surprises through Proactive, Real-Time Sensing and Alert Management," EESR Workshop on End-to-End, Sense-and Respond Systems, Applications and Services, 2005, 6 pages.

Gokce et al., "Vision-Based Detection and Distance Estimation of Micro Unmanned Aerial Vehicles," Sensors, 2015, 15:23805-23846, 42 pages.

Hale, "Evaluating safety management and culture interventions to improve safety: Effective intervention strategies," Safety Science, Oct. 2010, 48:8 (1026-1035), 10 pages.

Huia et al., "Prediction of Safety Objective of an Enterprise using Fuzzy Neural Network," International Symposium on Safety Science and Engineering in China, Procedia Engineering, 43: 162-167, 2012, 6 pages.

Husain et al., "Quantifying the Intelligent Field Added Values," SPE 167439, Society of Petroleum Engineers (SPE), presented at the SPE Middle East Intelligent Energy Conference and Exhibition, Oct. 28-30, 2013, 9 pages.

Memon et al., "Distributed control system for process control using intelligent agents," WSEAS Transactions on Systems, retrieved from URL <:https://www.researchgate.net/publication/270214069_Distributed_control_system_for_process_control_using_intelligent_agents>, retrieved on May 17, 2019, available on or before Mar. 1, 2006, 10 pages.

offshore-technology.com (online), "Take Control: Smart Valves Step Forward," retrieved from URL <http://www.offshore-technology.com/features/feature2034/>, Jun. 18, 2008, 6 pages.

Petrie et al., "Chapter 1: Introduction to Laser Ranging, Profiling, and Scanning," Topographic Laser Ranging and Scanning: Principles and Processing, 2008, 29 pages.

Petrie et al., "Chapter 3: Terrestrial Laser Scanners," Topographic Laser Ranging and Scanning: Principles and Processing, 2009, 43 pages.

pyimagesearch.com [online], Rosebrock, "Find distance from camera to object/marker using Python and OpenCV," Jan. 2015, retrieved on Oct. 21, 2020, retrieved from URL <https://www.pyimagesearch.com/2015/01/19/find-distance-camera-objectmarker-using-python-opencv/>, 109 pages.

Storey, "Building a Maintenance Management Program for Valves," Control Engineering, controleng.com (online), retrieved from URL <http://www.controleng.com/industry-news/single-article/building-a-maintenance-management-program-for-valves/20afd59f11c5dec4ec222cc79937e40b.html>, Apr. 17, 2014, 3 pages.

Reneke et al., "Research Roadmap for Smart Fire Fighting NIST SP 1191," National Institute of Standards and Technology, Jun. 2015, 1-247.

PCT International Search Report and Written Opinion in International Appln. No. PCT/US2021/044645, dated Dec. 1, 2021, 14 pages.

* cited by examiner

INFRASTRUCTURE CONSTRUCTION DIGITAL INTEGRATED TWIN (ICDIT)

CROSS-REFERENCE TO RELATED APPLICATIONS

This application is a continuation of and claims the benefit of priority to U.S. patent application Ser. No. 16/987,076, filed on Aug. 6, 2020, the contents of which are hereby incorporated by reference.

TECHNICAL FIELD

This disclosure generally relates to infrastructure construction and management.

BACKGROUND

Infrastructure construction and management may be based on progressing data from independent systems with massive data entries.

SUMMARY

In one aspect, the present disclosure describes a computer-implemented method to manage an industrial plant facility, the method including: monitoring multiple streams of input data from a network of sensors (both physical and soft sensing) at the industrial plant facility, wherein the network of sensors include one or more camera devices; determining, by a server computer, an event during construction or operation of the industrial plant facility based on analyzing the multiple streams of input data in real-time, wherein said analyzing comprises image processing of a stream of images from the one or more camera devices; and based on the determined event, generating a notification to alert at least one operator of the industrial plant facility.

Implementations may include one or more of the following features.

Determining the event of the industrial plant facility may include: determining an emergency occurring inside the industrial plant facility and in proximity to the at least one operator of the industrial plant facility. Generating a notification may include: sending an alert to a wearable device worn by the at least one operator to notify the emergency. The operations may further include: calculating an escape route to guide the at least one operator to safety based on, at least in part, where the emergency is occurring. The operations may further include: providing the escape route to the wearable device worn by the at least one operator. The operations may further include: updating the escape route when the at least one operator has started to escape from the emergency. Monitoring multiple streams of input data from a network of sensors may include: accessing streams of data from at least one of: an aerial scanning at the industrial plant facility, a mobile scanning at the industrial plant facility, and a floor scanning at the industrial plant facility, wherein the aerial scanning comprises operating at least one surveillance drone to monitor the industrial plant facility, wherein the mobile scanning comprises: operating at least one moveable sensor to monitor the industrial plant facility, wherein the floor scanning comprises: operating at least one fixed sensor to monitor the industrial plant facility, and wherein at least one of the one or more surveillance drones, the one or more moveable sensors, or the one or more fixed sensors comprise: the one or more camera devices.

In another aspect, the present disclosure describes a computer system comprising a network of sensors comprising one or more camera devices; a processor; and at least one memory, wherein at least one memory comprise software instructions that, when executed by the processor, causes the processor to perform operations to manage an industrial plant facility, the operations including: monitoring multiple streams of input data from a network of sensors at the industrial plant facility; determining an event during construction or operation of the industrial plant facility and its workforce based on analyzing the multiple streams of input data in real-time; and based on the determined status, generating a notification to alert at least one operator of the industrial plant facility.

Implementations may include one or more of the following features.

Determining the event of the industrial plant facility may include: determining an emergency occurring inside the industrial plant facility and in proximity to the at least one operator of the industrial plant facility. Generating a notification may include: sending an alert to a wearable device worn by the at least one operator to notify the emergency. The operations may further include: calculating an escape route to guide the at least one operator to safety based on, at least in part, where the emergency is occurring. The operations may further include: providing the escape route to the wearable device worn by the at least one operator. The operations may further include: updating the escape route when the at least one operator has started to escape from the emergency. Monitoring multiple streams of input data from a network of sensors may include: accessing streams of data from at least one of: an aerial scanning at the industrial plant facility, a mobile scanning at the industrial plant facility, and a floor scanning at the industrial plant facility, wherein the aerial scanning comprises operating at least one surveillance drone to monitor the industrial plant facility, wherein the mobile scanning comprises: operating at least one moveable sensor to monitor the industrial plant facility, wherein the floor scanning comprises: operating at least one fixed sensor to monitor the industrial plant facility, and wherein at least one of the one or more surveillance drones, the one or more moveable sensors, or the one or more fixed sensors include: the one or more camera devices.

In yet another aspect, the present disclosure describes a non-volatile computer readable medium comprising software instructions, which, when executed by a computer processor, cause the computer processor to perform operations to manage an industrial plant facility, the operations including: monitoring multiple streams of input data from a network of sensors at the industrial plant facility, wherein the network of sensors include one or more camera devices; determining an event during construction or operation of the industrial plant facility based on analyzing the multiple streams of input data in real-time; and based on the determined event, generating a notification to alert at least one operator of the industrial plant facility.

Determining the event of the industrial plant facility may include: determining an emergency occurring inside the industrial plant facility and in proximity to the at least one operator of the industrial plant facility. Generating a notification may include: sending an alert to a wearable device worn by the at least one operator to notify the emergency. The operations may further include: calculating an escape route to guide the at least one operator to safety based on, at least in part, where the emergency is occurring. The operations may further include: providing the escape route to the wearable device worn by the at least one operator. The operations may further include: updating the escape route when the at least one operator has started to escape from the emergency. Monitoring multiple streams of input data from a network of sensors may include: accessing streams of data from at least one of: an aerial scanning at the industrial plant facility, a mobile scanning at the industrial plant facility, and a floor scanning at the industrial plant facility, wherein the aerial scanning comprises operating at least one surveillance drone to monitor the industrial plant facility, wherein the mobile scanning comprises: operating at least one moveable sensor to monitor the industrial plant facility, wherein the floor scanning comprises: operating at least one fixed sensor to monitor the industrial plant facility, and wherein at least one of the one or more surveillance drones, the one or more moveable sensors, or the one or more fixed sensors comprise: the one or more camera devices.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to infrastructure construction and management. The current industry practice in infrastructure construction and buildout progressing and quality integrity is based on manual processing supported by independent systems with massive data entries. Moreover, the current practice lacks an integrated systems that can capture the whole process of construction from design, supplies, construction asset, construction tools, material, workforce, and quality controls. In contrast, the present disclosure introduce an end-to-end operating model for an integrated digital twin, Infrastructure Construction Digital Integrated Twin (ICDigIT), the serves to bridge the construction and operation of an industrial facility. For example, the ICDIT encompasses the complete cycle of the facility construction and operation, including, Engineering Design and Simulation, Procurement and Logistics, Construction and Handover, and Operation and maintenance. The supply chain management attribute across these four main segments is included.

The Infrastructure Construction Digital Integrated Twin (ICDIT) is based on interaction and interplay between exemplary components in designing and construction of a plant facility. These components encompass various aspects of data sensing, collection, exchange, and computing. In one use case example, implementations of ICDIT can track asset build/assembly during construction. Here, real-time information such as imagery from the construction site, data from traffic scanning of asset movements, data from sensor networks at the construction site may be leveraged to determine construction progress, inventory tracking, etc. In another use case example, a controller provides route mapping and localization services throughout the plant for which guided escape routes maybe improvised in hazardous events such as gas leaks or fire outbreaks. In other words, during an emergency, a wearable device on a crew member may be equipped with real-time location and situation awareness information to navigate the crew member through the thick of the emergency to safety.

Figure 1A:
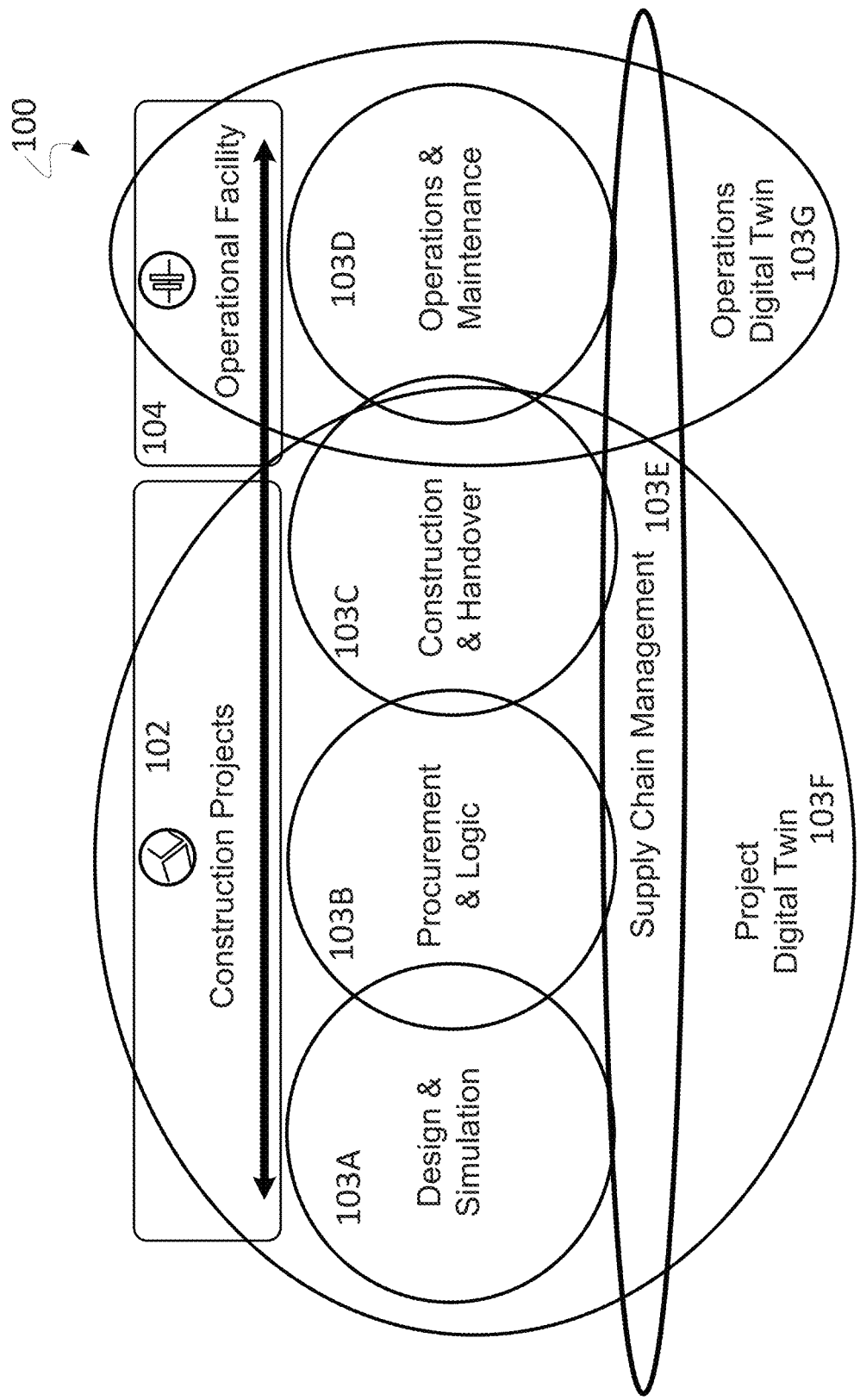
FIGS. 1A to 1C illustrate examples of various aspects of an Infrastructure Construction Digital Integrated Twin (ICDigIT) according to an implementation of the present disclosure.
Figure 1B:
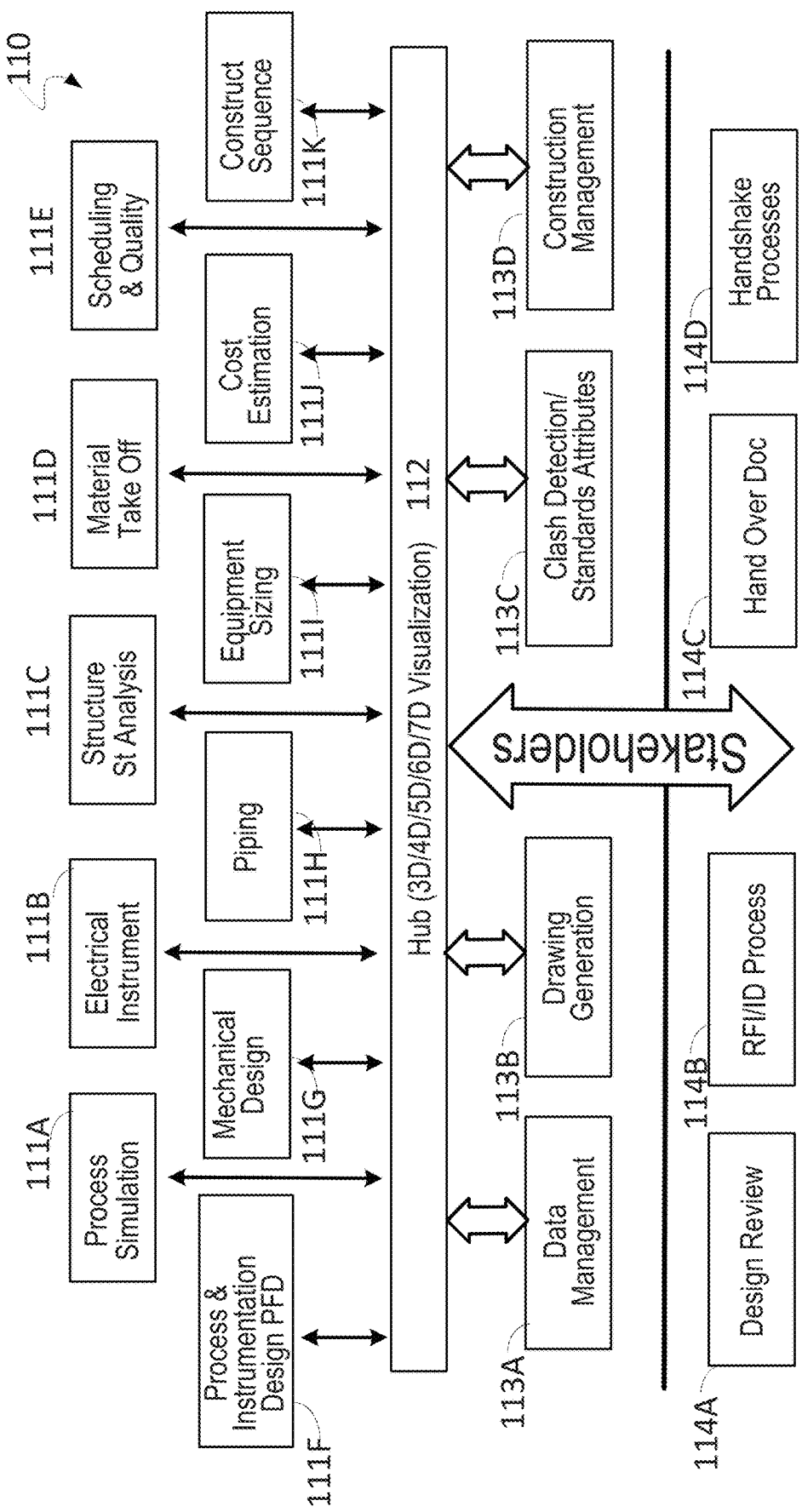
Figure 1C:
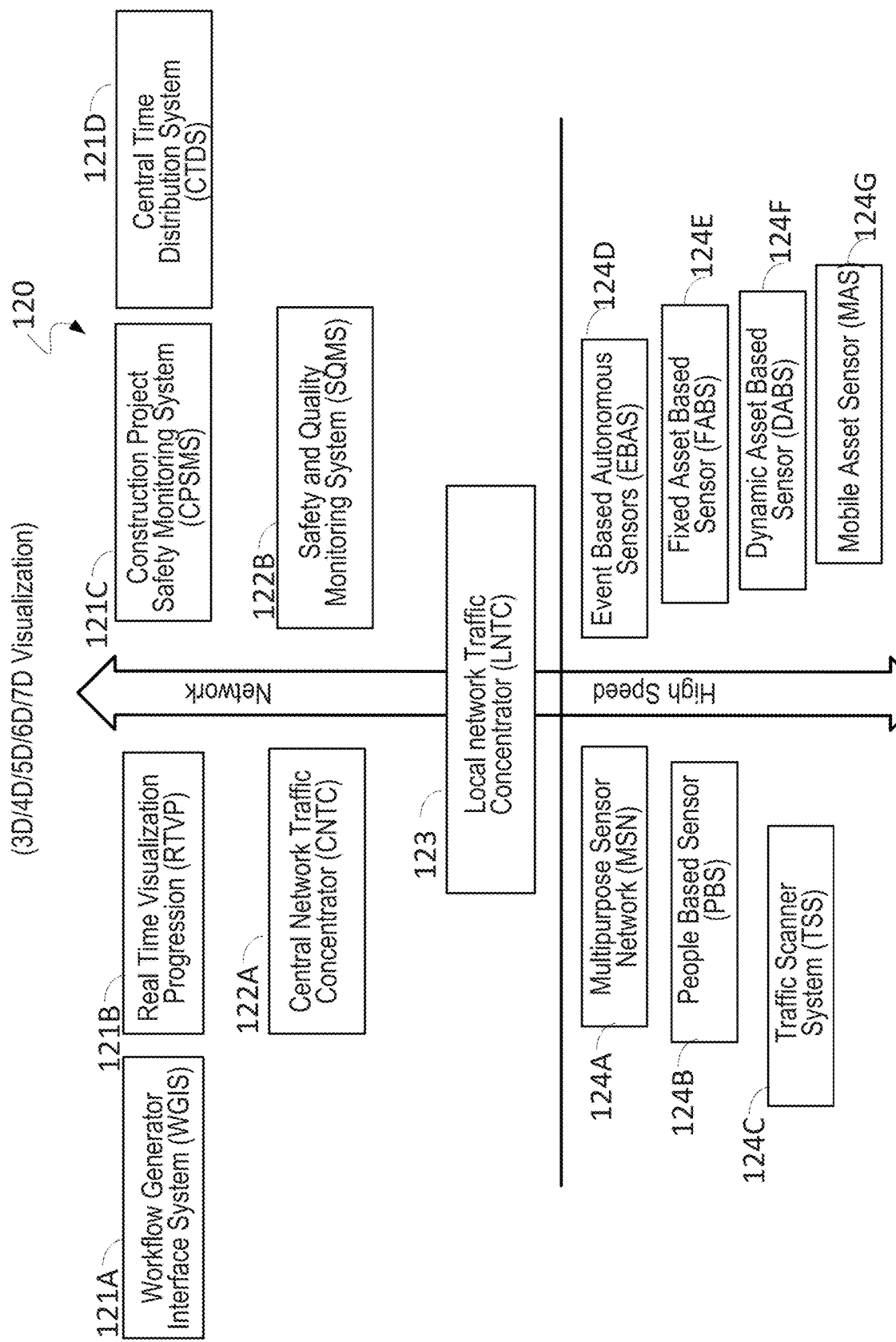

FIGS. 1A to 1C illustrate examples of various aspects of an Infrastructure Construction Digital Integrated Twin (ICDIT). As illustrated by diagram 100, the ICDIT encompasses complete cycles of the facility construction and operation, including construction projects 102 running the project digital twin 103F and operation facility 104 running the operations digital twin 103G. The project digital twin may include engineering design and simulation module 103A, procurement and logistics module 103B, and construction and handover module 103C. The operations digital twin 103G may include operations and maintenance module 103D. The supply chain management module 103E may extend over both twins.

The ICDIT 100 is based on interaction/interplay between the components in designing and construction of plant facility, which, as illustrated by diagram 110, can include superimposed multidimensional data acquisitions, processing, correlation, and visualization. The multidimensional aspects can include 3D, 4D (time), 5D (Cost), 6D (Efficiency), up to 7D (Operate & Maintain). These components, as outlined below, together form the digital twin for the facility construction. The visualization Hub 112 interacts with process simulation module 111A, electric instrument module 111B. structure stability analysis module 111C, material take-off 111D, scheduling and quality 111E, process and instrumentation design PFD 111F, mechanical design module 111G, piping module 111H, equipment sizing module 111I, cost estimation module 111J, construction sequence module 111K. As illustrated, the visualization hub 112 engages data management 113A, drawing generation 113B, clash detection/standards attributes 113C, and construction management 113D. The visualization hub 112 further engages design review 114A, RFT/ID process 114B, hand over document 114C, and handshake processes 114D.

The ICDIT 100 incorporates data sensing, collection, exchange, and computing over high speed network exemplified by local network traffic concentrator LNTC 123, as illustrated by diagram 120 of FIG. 1C. In more detail, The ICDIT 100 is based on interaction, interplay of hierarchical building blocks including work flow generator interface system (WGIS) 121A, real time visualization progression RTVP 121B, construction project safety monitoring system (CPSMS) 121C, central time distributed system (CTDS) 121D, central network traffic concentrator (CNTC) 122A, safety and quality monitoring system (SQMS) 122B. Through high speed network managed by local network traffic concentrator (LNTC) 123, multipurpose sensor network (MSN) 124A, people based sensor (PBS) 124B, traffic scanner system (TSS) 124C, event based autonomous sensors (EBAS) 124D, fixed asset based sensor (FABS) 124E, dynamic asset based sensor (DABS) 124F, and mobile asset sensor (MAS) 124G jointly provide location and situation awareness for multidimensional visualization including 3D, 4D (time), 5D (Cost), 6D (Efficiency), up to 7D (Operate & Maintain).

The local network traffic concentrator (LNTC) 123 can connect to wired and wireless field devices and networks. The LNTC 123 includes computing and data storage capability. The LNTC can process all collected data and produce reporting and new database that can be used by other $3^{rd}$ party applications for Artificial Intelligence (AI) and Machine learning application. The LNTC 123 includes software interface capabilities (Application Programming Interface or API) to connect with other databases locally or in wide area network. The LNTC 123 can translate captured images for the dynamic asset and establish mapping to the facility build out plan, timelines, asset inventory, and produce a predictive model on anticipated progress, asset consumption. In some cases, the LNTC 123 can capture all the data from the operator within the facility, can capture data from mobile, can translate captured images for the dynamic asset and detect metrological hazards and/or unsafe conditions, can capture all the data from EBAS 124D, and can communicate commands to SQMS 122B.

In comparison, the CTDS 122A is based on fault tolerant network time protocol (NTP) clock synchronization with a direct GPS feed. The CTDS 122A has internetworking capability to interface all the field devices. The CTDS 122A can synchronize all field devices with the same time stamp point.

The workflow generator interface system (WGIS) 121A can develop, add, delete, and modify workflows for asset use and resource management. For example, the interface workflow may merge seamlessly with communication systems such as email, wired phone, mobile phone, and other web-interface communication systems.

The real time visualization progression (RTVP) 121B can display real-time build out activities program. For example, the RTVP 121B may superimpose build out 3D image with the real-time progress feed. The RTVP 121B may provide dashboard and reporting capabilities on both construction progress and safety behavior metrics. The RTVP 121B may have the capability to detect schedule and geometric mismatch between the real-time captured 3D module and the 3D planned design. The RTVP 121B may include software interface capabilities (Application Programming Interface, e.g., API) to connect with other databases locally or in wide area network. The RTVP 121B may have the capability to communicate with DABS 124F and/or EBAS 124D to request camera movement and robot/drone dispatch.

The safety and quality monitoring system (SQMS) 122B can be embodied as a construction project quality monitoring system (CPQMS) and a construction project safety monitoring system (CPSMS). In case of the CPQMS, SQMS 122B can project construction progress visualization through the creation of 3D models from videos and imagery taken either by ground CCTV systems or aerial photogrammetry such as from drones. The data from the 3D models are correlated with asset construction progress from resource management. This can include 2D engineering tools, materials management, project controls, scheduling systems, and video and analytics systems. The SQMS 122B can provide 3D scanning to capture the construction status and verify it against the design basis in the 3D model to ensure that future construction and operation will proceed smoothly and identify any quality issues as early as possible. The SQMS 122B can provide true 3D model from a circular aperture or multiple single aperture, with high definition resolution (mm to km), provides active and passive 3D modeling, and allows identification and tagging for industrial equipment. The SQMS may utilize the available data from 3D models, 2D engineering tools, materials management, project controls, and scheduling systems, to ensure that accurate and timely decisions can be made on the most updated information needed for optimized construction planning and execution.

In the case of the CPSMS, the SQMS 122B can include monitoring, detection and notification of workers health, unsafe behaviors and unsafe conditions using data from the available work management systems including access control, health monitoring systems, and meteorological monitoring systems. The SQMS 122B involves acquiring, processing and analysis of CCTV systems video and imagery output. The SQMS provides real-time notifications when a potential safety violation is occurring that is related to workers health, unsafe behaviors and unsafe conditions. The SQMS 122B gathers and integrates data from worker health conditions, meteorological conditions and related site safety requirements. The SQMS 122B can includes worker identification by, for example, providing facial identification (or other biometrics), regulating access authorization to restricted areas, regulating general access authorization whether to allow or deny identified individuals, and creating space safety zones. The SQMS 122B can further monitor worker health conditions including, for example, heat and cold stress conditions, slip and fall incidents, fatigue conditions, man down incidents, overexertion conditions, and fit to drive status, track location, monitor proximity alerts, create time safety limits (e.g., flagging workers not following minimum resting requirements), and link requirements with meteorological conditions. The SQMS 122B can additionally assist to enforce personal protective equipment (PPE) by, for example, defining PPE safety requirement zones, detecting, safety shoes, safety vests, safety harness at elevated platforms for instance, eye protection, helmet and hard hat, and ear plugs. The SQMS 122B may further enforce early detection of other workplace surrounding hazards including, for example, falling hazards from elevated platforms or shop-floor surfaces such as slippery surfaces, trip hazards, clutter, leaks, standing water, working at heights, and fall protection gear. Such workplace surrounding hazards may additionally include: electrical overhead travelling crane, and mobile equipment hazards and electrical hazards. The SQMS 122B may additionally identify when a worker shows signs of fatigue; identify blocked fire exits, spills, and over-stacking/blocked sprinkler heads;

identify prohibited usage of mobile inside process areas; use tagging to track chemicals, and how long they have been kept, notify when hazardous chemicals are pulled from storage; notify and tack how long an employee enters a confined space, repetitive motion alert, improper lifting form alert; and identify unauthorized vehicles accessing prohibited areas.

The multipurpose sensor network (MSN) 124A includes integrated sensors that have direct and indirect contact sensing capabilities covering people, fixed asset (such as completed buildings), dynamic asset (such as drillings), mobile asset (such as vehicles) and autonomous sensors. The MSN 124A may communicate via wire, wirelessly, or both. The MSN 124A is capable of operating at various temperature and weather conditions (e.g., rainy or dusty weather). The MSN 124A can additionally trigger visual and/or audible notification. In more detail, the sensors can has computing and data storage capability in addition to retaining time and location. The sensors can also be personalized to an operator or worker specific setting.

The people based sensor (PBS) 124B may include durable sensor and non-reusable sensor. An example of a durable sensor can be an equipment supported by long last power source, digitally operated with contact sensors that has the ability to be personalized and collect human essential health signs, location, movement, direction, and posture. Human essential health signs sensor may be based on direct sensor contact with the human body, hand wrest, chest, and or legs. It can be embedded as part of a wearable uniform and or similar to other personal protective equipment (Hats, Wearable clothes, and portable with connection on demand). Location aware sensor has the ability to keep track of the location based on, for example, global positioning system (GPS) or radio-frequency identification (RFID) positioning system. These sensor generally retain movement and direction and may relay the collected data. An example of a non-reusable sensor include a sensor made of synthetic material that that can be attached on human to a surface. While such sensors can be discarded, the non-reusable sensors support RFID technology and are readable by RFID scanning technology. For example, each may be associated with a unique 2D bar code that can be scanned by a camera device.

The fixed asset based sensor (FABS) 124E can report on location and trigger alarms upon unauthorized mobility. The dynamic asset based sensor (DABS) 124F can be equipped by video/optical sensor network that keep tracks of its progression. In some instances, the optical/video system will be based on high resolution (60 frame per second). The optical/video camera movement can be based on a control loop feed. The control feed input may be based on detection of a change in construction or predefined schedule. The optical/video system may be capable of wide-angle capturing (80 degrees) field of view, super-wide angle of 180 degrees or higher.

The mobile asset sensor (MAS) 124G may be equipped with a device to capture data on speed, engine health status, operating hours, outage time, parts replacement. The MAS 124G may be networked and location aware of the current position. In some instances, the MAS 124G has 360 sensing capability of other objects within 1 to 15 meters. In these instances, the MAS 124G may incorporate a control loop based on feedback input from other assets of approaching objects and trigger alarms to prevent direct contact with other objects.

The event based autonomous sensors (EBAS) 124D may be equipped by video/optical sensor network mounted on autonomous robotics and/or drones. In some cases, the optical/video system is based on high resolution (60 frame per second). In these cases, the EBAS movement can be based on a control loop feed with autonomous maneuver algorithm/AI. The control feed input is based on a request from PBS 124B, FABS 124E, DABS 124F or MAS 124G, predefined schedule or manual dispatch. The optical/video system may be capable of wide-angle capturing (80 degrees) field of view, super-wide angle of 180 degrees or higher.

The traffic scanner system (TSS) 124C can scan people, tools, and assets. In some cases, the TSS 124C include scanners that are positioned based on the build out structure pathways. In these cases, the scanners are connected to alarm and sound system that will be trigged by the object movements with corresponding sound or message. Each scanner may include local computing and data storage capabilities, can communicate wirelessly or in a wired manner, and can read data via RFID technology.

Figure 2A:
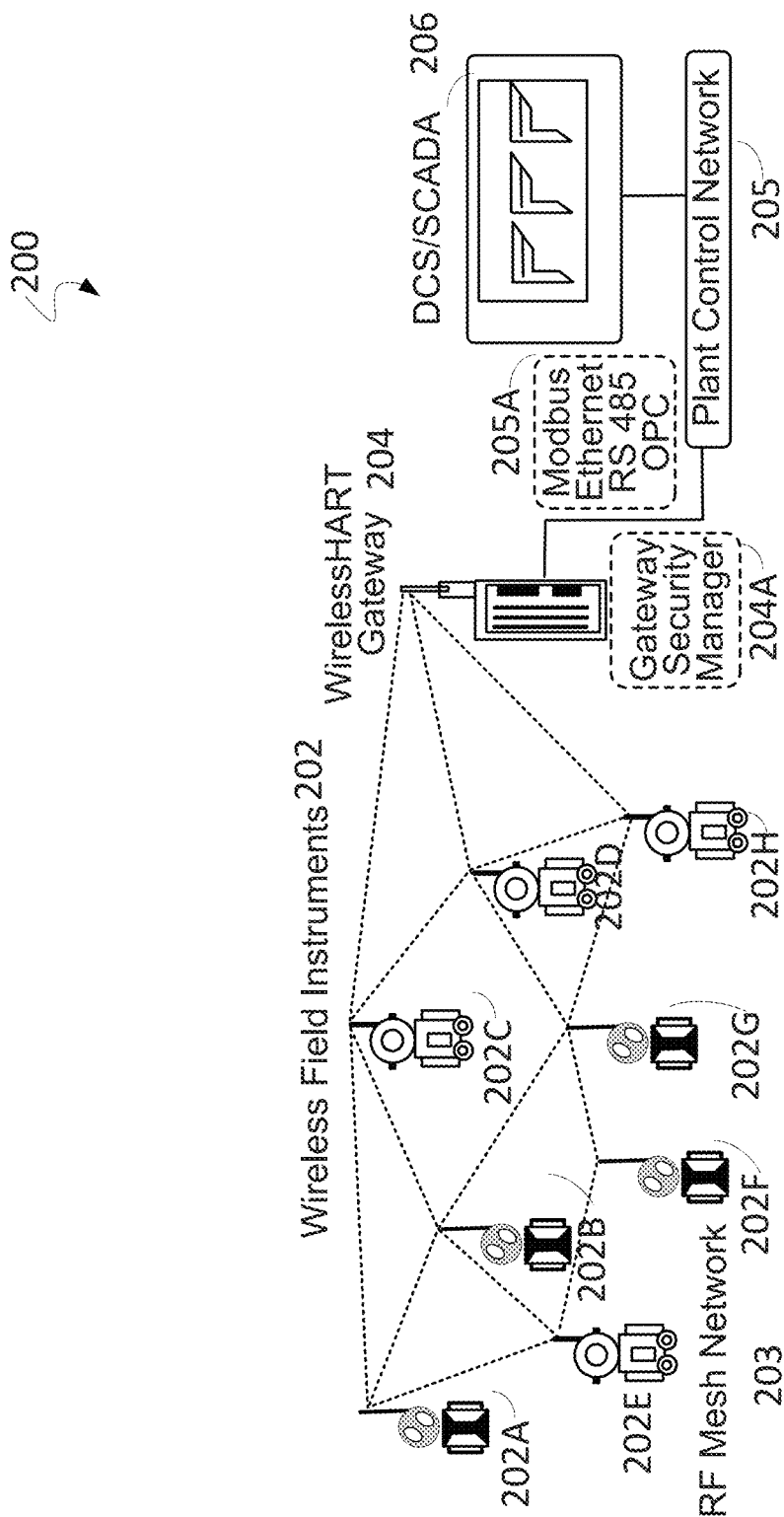
FIGS. 2A to 2C illustrate examples of a Wireless; Wireless ISA, Long-Range Wide Area Network (LoRaWAN), and or 5$^{th}$ Generation Wireless network architecture according to implementations of the present disclosure.

Implementations described in the present disclosure can provide seamless integration with plant automation systems of an industrial plant, enabling it to receive commands and respond to alarms and system alerts. As illustrated in FIG. 2A, an example of a Wireless, Wireless ISA, Long-Range Wide Area Network (LoRaWAN), and or $5^{th}$ Generation Wireless network architecture 200 can include wireless field instruments 202 (further including instruments 202A, 202B, 202C, 202D, 202E, 202F, 202G, and 202H that form a RF mesh network 203), and a Wireless gateway 204 on a plant control network 205 (e.g., through interface 205A that includes Ethernet). The plant control network 205 may operate a DCS (distributed control system) that emphasizes process-level operations, or a SCADA (supervisory control and data acquisition) that is event-driven and prioritizes data gathering (206). For example, A DCS delivers data to operators, and at the same time, a SCADA concentrates on the acquisition of that data. The Wireless gateway 204 may operate a gateway security manager 204A. The Wireless gateway 204A may include three main functions, namely, access point, radio, and manager, in one box serving only one particular area in the plant. As described in the present disclosure, the Wireless network is re-architected so that the "Radio" and "access point" are detached from the controller and managing software. The access point are distributed throughout the plant and are connected back to "one" controller serving the entire plant facility. The central controller does not only provide wireless connectivity management but also provided wireless power to access point. The process control instrumentation module includes a unified Wireless gateway function embedded in a central controller that interconnects and manages the field receptors.

Figure 2B:
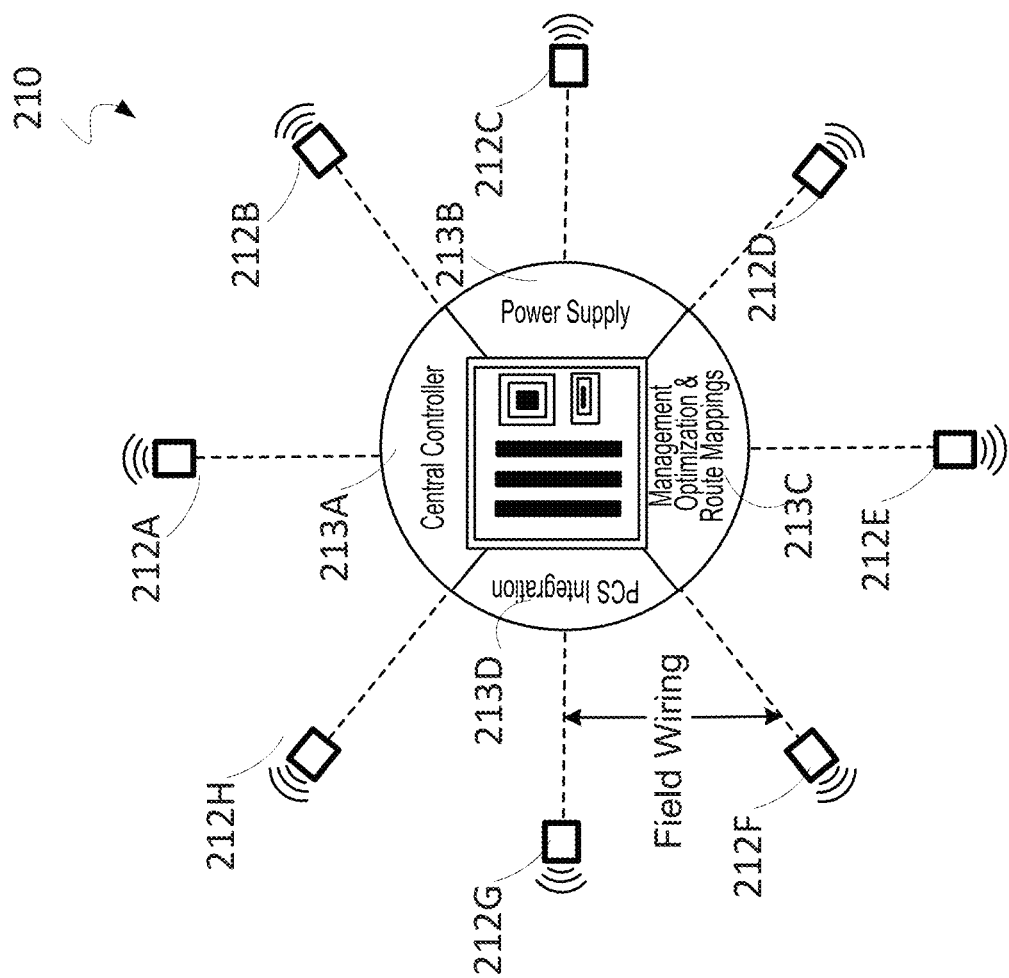

Further referring to diagram 210 from FIG. 2B, the Wireless radio receptors (212A, 212B, 212C, 212D, 212E, 212F, 212G, and 212H) connect the remote field devices utilizing the 2.4 GHZ frequency band. The receptors are connected via physical medium back to the central controller 213A where the unified Wireless gateway is performed. The central controller 213A may include power supply 213B, management optimization and route mappings 213C, and PCS&DM (Process Control System and Data Monitoring) integration 213D. The Wireless gateway thus acts as a unified medium between the Wireless connected devices and the plant network using standard protocols such as Modbus or Profibus.

In some case, the controller comprises a unified Wireless gateway function interconnecting distributed wireless field transceiver using 802.11b/g/n/ac WLAN and converts the HART data to Modbus TCP for easy integration with the plant's control systems. The integration with plant's control systems can be made via an Ethernet port or the integrated controller through which it also connects the various WLAN client transceiver. The data collected from the field Wireless transceivers converted into Modbus TCP before transporting them on the plant's control systems. The controller is configurable and manageable via an embedded secure terminal connection for which detailed system diagnostics can also be made available. The field wireless transceiver is capable of connecting up to, for example, 250 Wireless field devices with the capability of an RF Link relay indication and the ability to measure the strength of the WLAN signal as an analog voltage. The field devices are automatically (dynamic assignment) assigned a Modbus ID to enable it to communicate with the master controller.

Figure 2C:
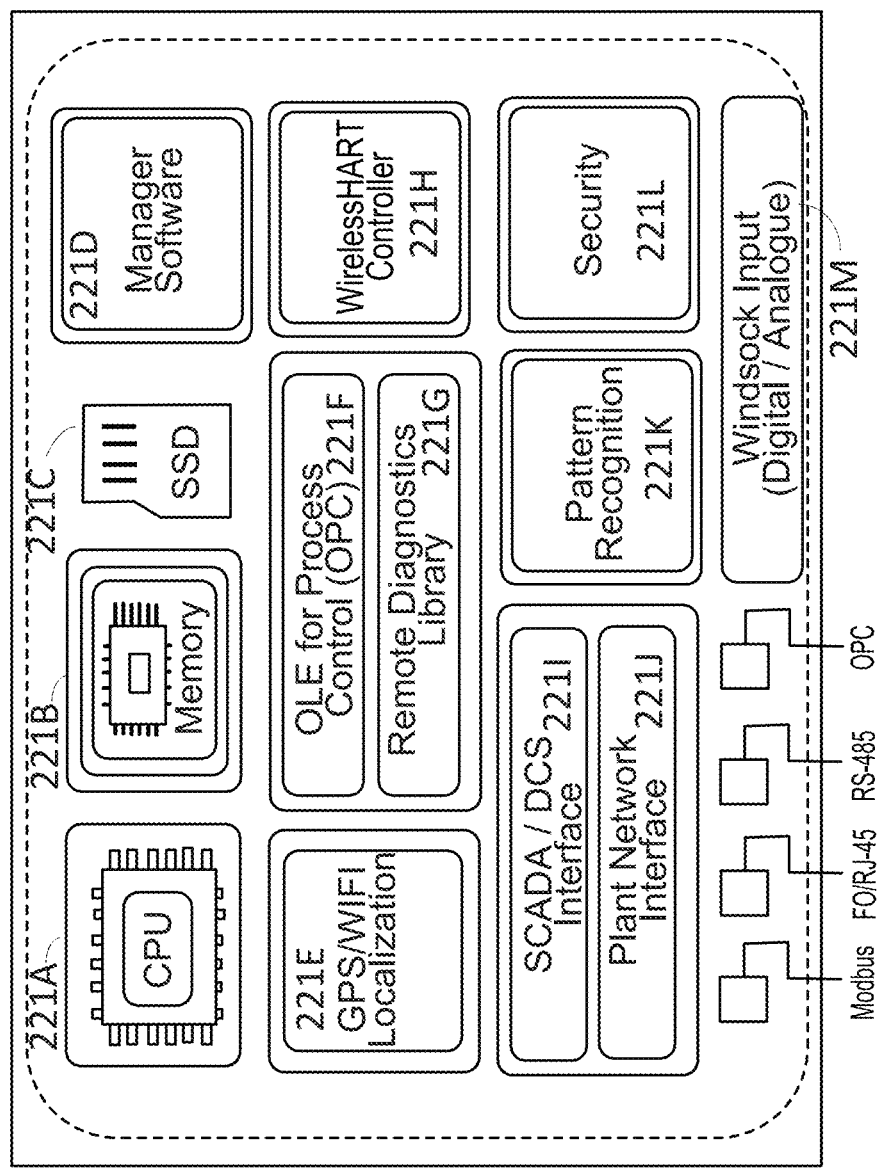

FIG. 2C shows an example of a Wireless gateway 220 to illustrate the unified Wireless controller components according to some implementations. The Wireless gateway 220 includes CPU (central processing unit) 221A, memory 221B, SSD (solid state storage device) 221C, management software 221D (which may include firmware), GPS/WiFi localization module 221E, OLE (object linking and embedding) for process control (OPC) 221F, remote diagnosis library 221G, Wireless HART, ISA, Long-Range Wide Area Network (LoRaWAN), and or 5th Generation Wireless controller 221H, SCADA/DCS interface 221I, plant network interface 221J, pattern recognition 221K, security module 221L, windsock input 221M, in addition to Modbus, RJ45, RS485, and OPC interface connectors. Here, windsocks are used to provide indication of wind speed and direction in analogue or digital representation. Windsocks may be used at petrochemical plant facilities where s risk of gaseous leakage or fire exist. In some windsock implementations, wind speed is indicated by the windsock's angle relative to the mounting pole; in low winds, the windsock droops; in high winds it flies horizontally. The speed of wind is estimated by highly visible orange and white stripes with each stripe adds up 3 knots to the estimated wind speed. For the present disclosure, a digital or analogue output windsock will be used to provide general wind speed and direction which will be used by the emergency route escape mapping procedures to determine the most accessible and safe exit for workers should an emergency occur.

Figure 3A:
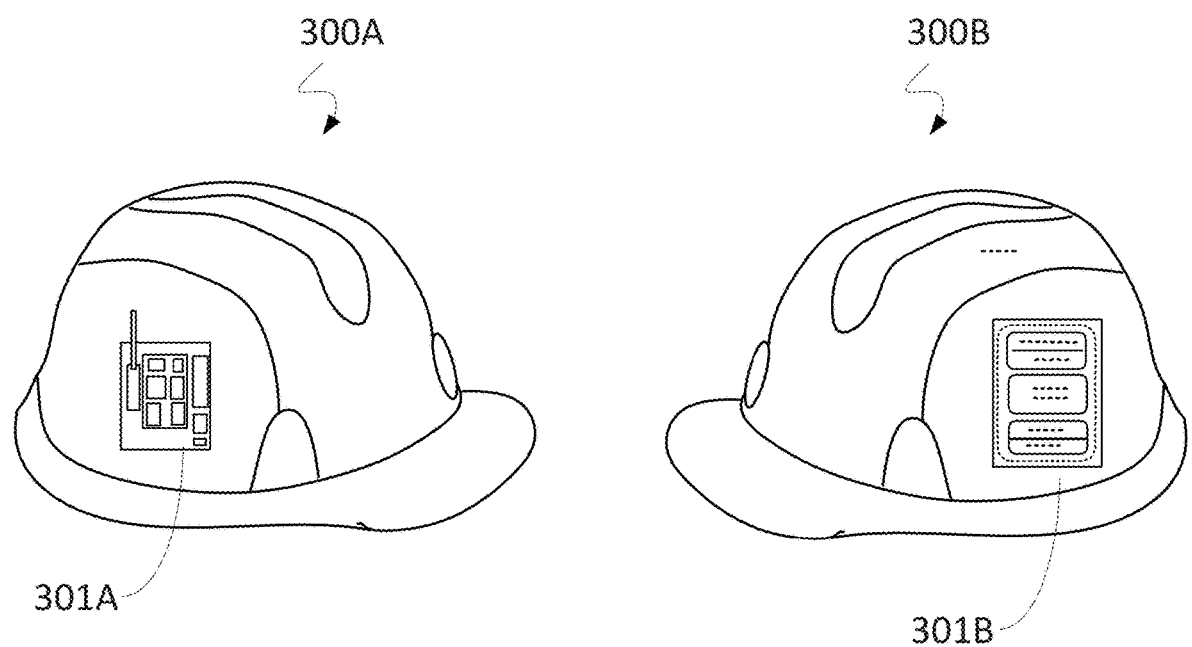
FIGS. 3A to 3B illustrates examples of an intelligent wearable device according to some implementation of the present disclosure.
Figure 3B:
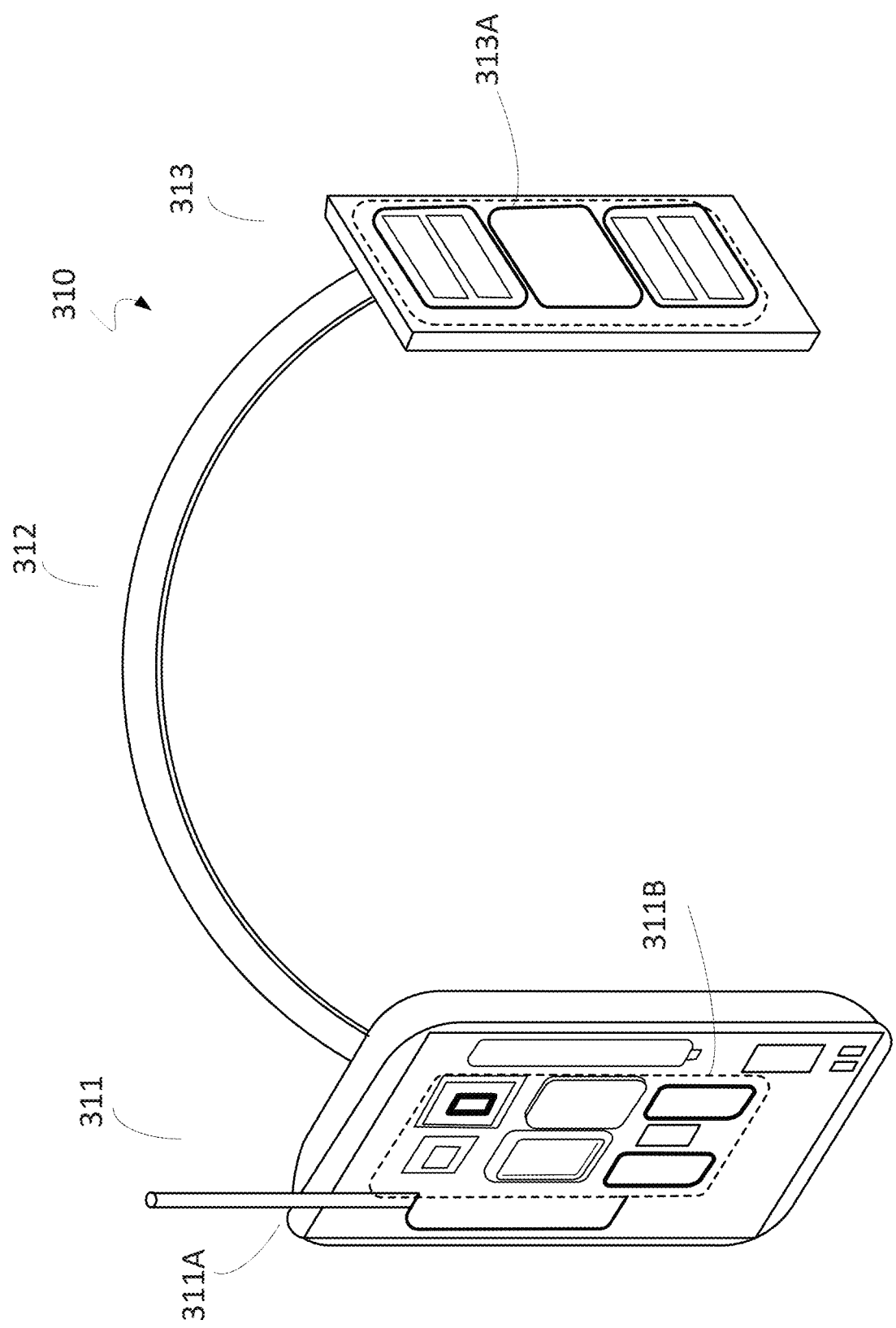

Intelligence Instrumentation will provide the hat (helmet) with hardware/software based technical abilities to perform intelligent functions such as localization and guidance, expanded diagnostics based on pattern recognition and image analysis. Referring to FIG. 3A, an example of a helmet 300A can include a side-mounted intelligent device 301A while another example of a helmet 300B can include a side-mounted intelligence device 301B. The mounting location can be slightly above the ear location. As illustrated in FIG. 3B, an example of an assembly 310 can include a transceiver module 311 that includes antenna 311A and electronics 311B, a connector belt 312, and a terminal 313 that includes touch pad 313A with tactile control. In this example, the transceiver module 311 can be mounted on the outside of the helmet while the terminal 313 can be mounted on the inside of the helmet, for example, closer to the eye. The terminal 313 may also include projector-type of display to be mounted on, for example, towards the forehead region to project a visual display to the operator wearing the helmet. In some cases, the apparatus can support a helmet attached an ultrasound mobile emitter that can be used to scan the outer surface of pipes for potential corrosion or deformation. In these case, a portable hydrophones can be used to complement the function of the ultrasound emitter from the helmet. In some cases, the apparatus is able to read equipment tag and fetch information related to inventory, for example, supply and spare parts availability/compatibility.

Figure 3C:
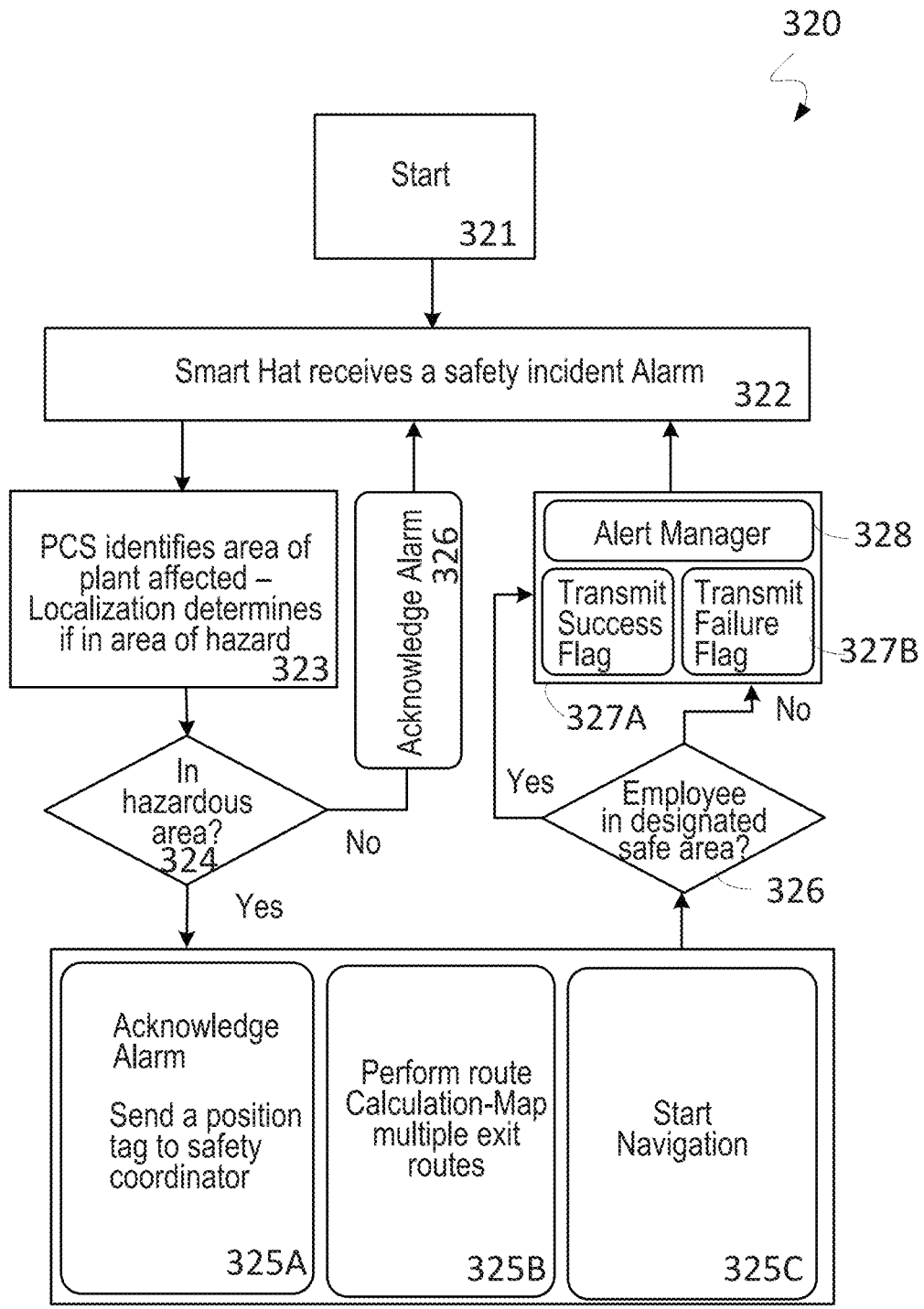
FIG. 3C illustrates an example of a flow chart according to an implementation of the present disclosure.

FIG. 3C illustrates an example of a flow chart 320. The process starts (321) and a smart helmet (or hat) receives a safety incident alarm (322). In response, the PCT identified the area of the plant affected by the incident (323). In other words, the location of the incident determines whether the incident is in an area of hazard (324). If the determination is that the incident is not in a hazardous area, the process may proceed to acknowledge the alarm only (326). If the determination is that the incident is in a hazardous area, the process may proceed to acknowledge the alarm and second a position tag to a safety coordinator (325A), perform route calculation and map multiple exit routes (325B), and then starts navigation to guide the operator to safety (325C). The process may receive updated location from the operator's helmet and determine, in real time the whereabouts of the operator. Based on the location of the operator, the process may determine whether the operator is in a designated safe area (326). If the determination is yes, the process may transmit a success flag to alert manager 328 (327A). Otherwise, the process may transmit a fail flag to alert manager 328 (327B). The alert manager 328 may further communicate with the smart helmet.

Figure 4A:
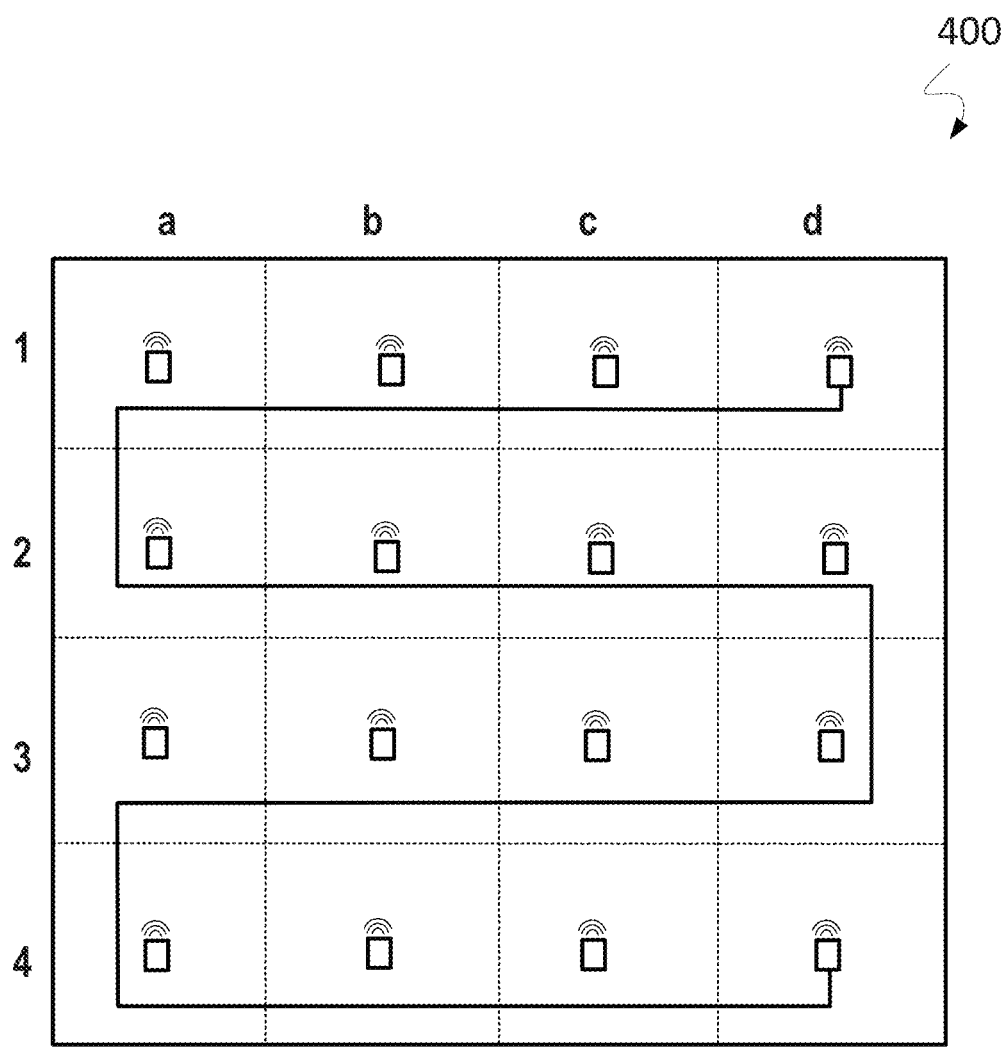
FIGS. 4A-4E illustrate examples of handling an emergency in an industrial plant facility according to an implementation of the present disclosure.
Figure 4B:
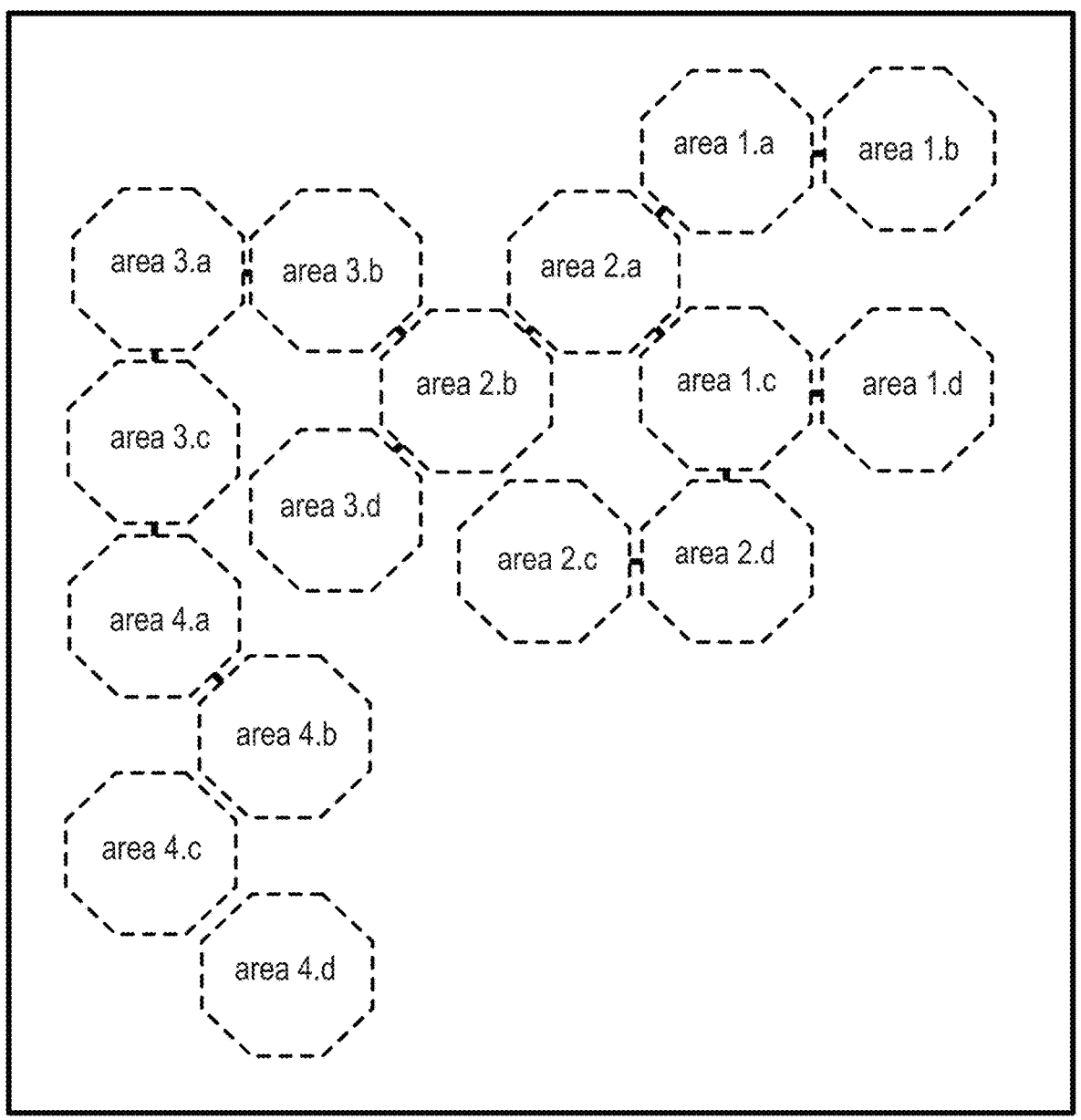
Figure 4C:
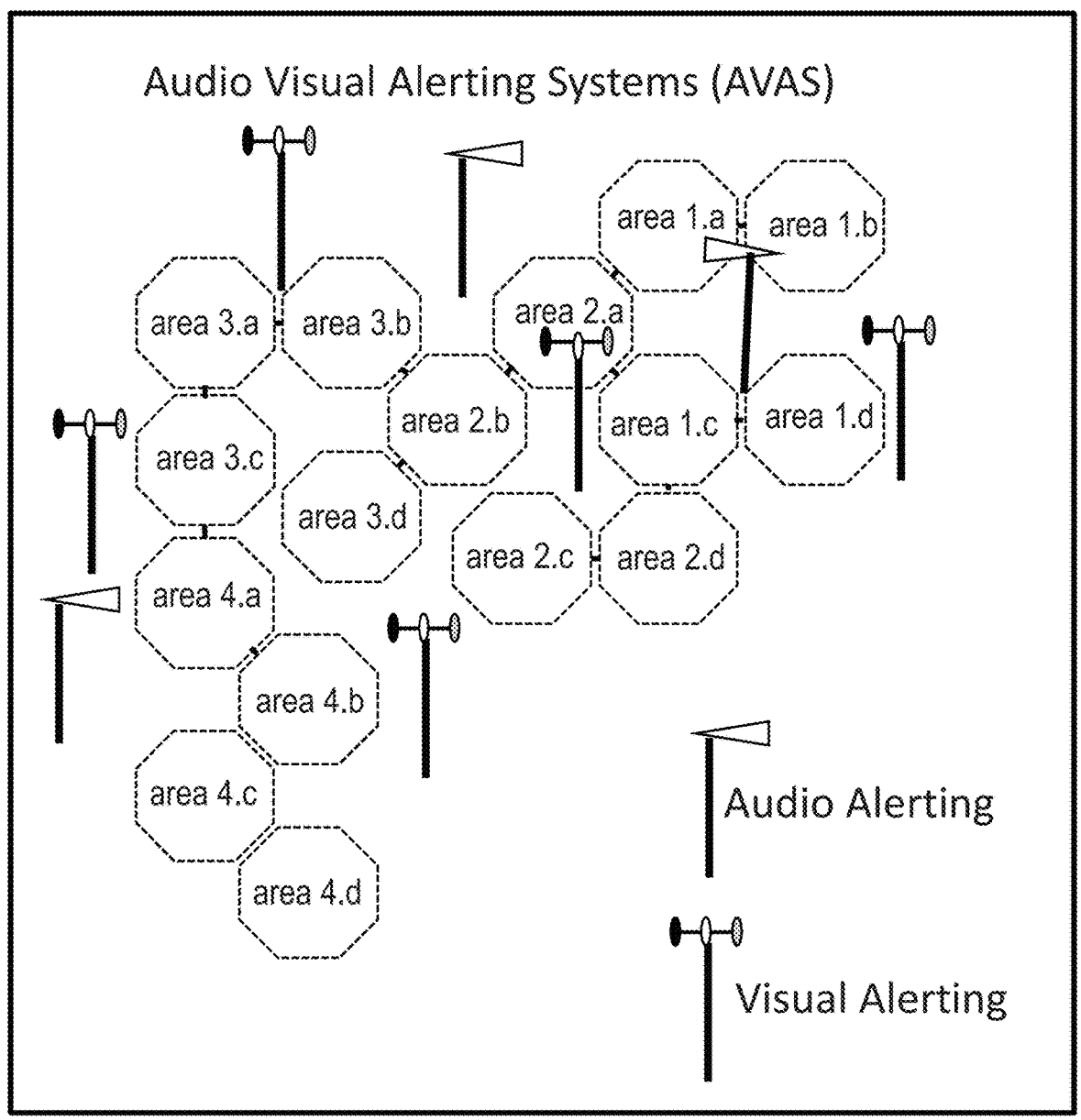

In some implementations, the plant floor is divided into a number of cells or areas of coverage to facilitate adequate wireless connectivity and reliable integration to the process control systems. The areas are defined as part of a matrix with rows and columns so that each cell is addressable by its row and column identifier. As illustrated in FIG. 4A, an example of a plant floor 400 is divided 16 sixteen cells, in rows 1 to 4 and columns a to d. In this example, a receptor, which can operate on the Wireless protocol, is installed in each coverage area whereby the signal quality and propagation is ensured. The receptors are distributed throughout the plant floor and are connected to a central management controller for the whole plant facility. Further referring to FIGS. 4B to 4C, the placement of the receptors, as illustrated by plans 410 and 420, provide coverage for each area marked in hexagonal region, from area 1 (and sub-regions a to d), area 2 (from sub-regions a to d), area 3 (from sub-regions a to d), and area 4 (from sub-regions a to d). The hexagonal cells are grouped into respective areas, each can have its own connectivity or security profile.

Moreover, Audio Visual Alerting Systems (AVAS) is included in each area or region. The AVAS includes signal initiation, transmission, notification, and annunciation in the area designed and installed to meet the levels of performance. The AVAS components (loud speaker and alerting light) are used to complement the wireless Personal Protected Equipment and or Mobile Device communication. The AVAS stations are installed at least 1.5 Meter from the work area ground level of each Area or one or more Area to enable Operator to have a visual and can hear audio. AVAS provides visual alerting and visual systems such as changing color coding: Green=safe; Red=is danger; and flashing amber implies work is in progress). The AVAS Light and Audio stations which consist of amplifiers, junction enclosures, plugs and loudspeakers installed in Area are to be in compliance to area classification (industrial requirements Hazardous and standard building Management). AVAS will imply acoustic safety components in areas where ambient noise levels exceed 80 dBA. The AVAS include a multi-tone generator capable of generating different types of tones for different emergency conditions, such as, yelp, warble, siren, and steady tone.

The controller performs management and administration functions such as security management and controls including authentication and traffic optimization process for connected field devices. The controller also provides route mapping and localization services throughout the plant for which guided escape routes maybe improvised in hazardous events such as gas leaks or fire outbreaks. The controller is connected to all plant distributed receptors via physical mediums such as copper or fiber optic cabling to eliminate or minimize interference and provide robust and reliable system interconnectivity.

Figure 4D:
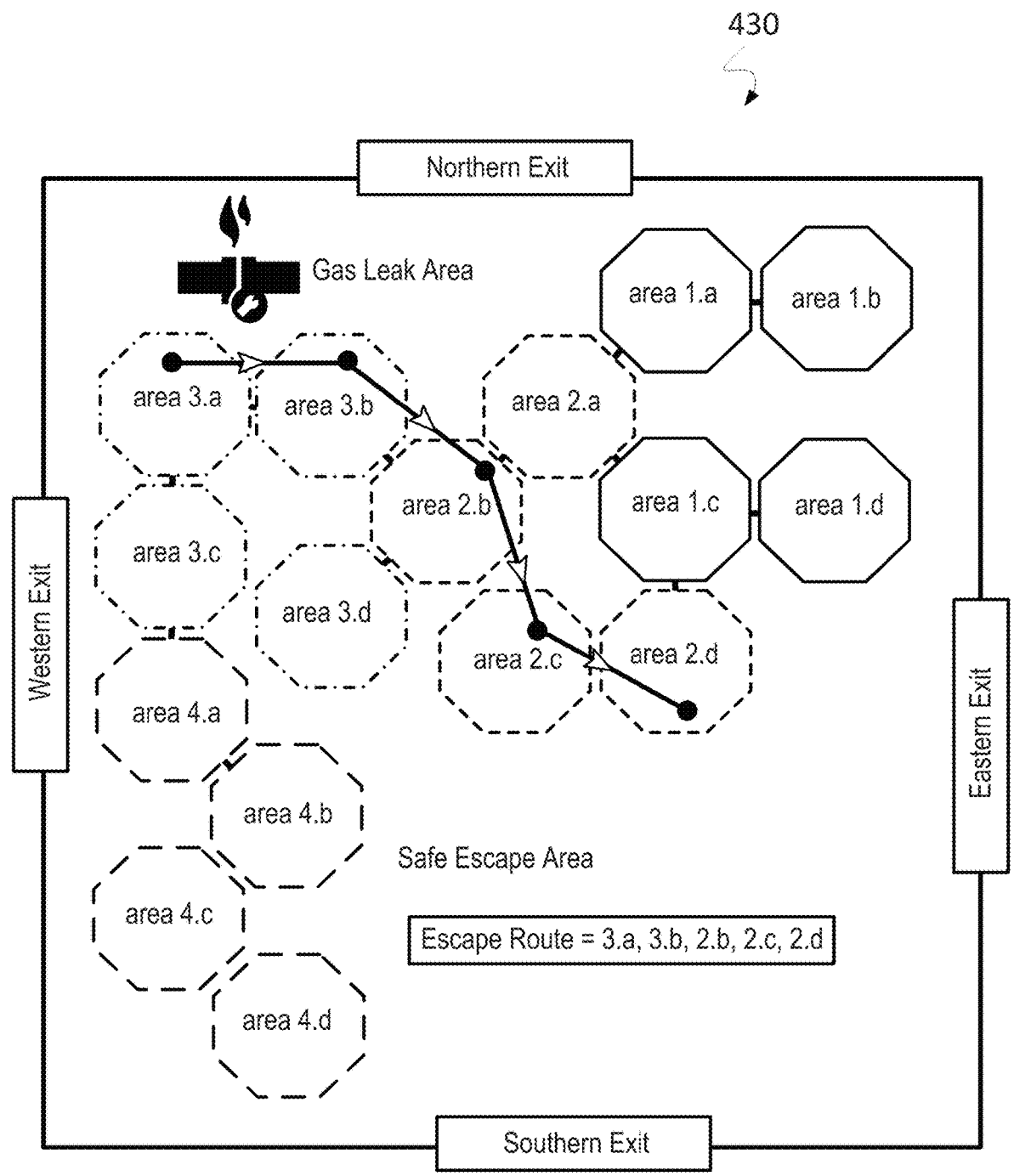

FIG. 4D illustrates a use case 430 of intelligent guidance for escape routes during emergency. As illustrated, a fire breaks out due to gas leak in an area close to the northern exit. An operator, for example, an employee operating on-site is notified of the emergency right away. Here, the controller may calculate an escape route based on real-time information from the various sensors at the plant. In this illustration, the computed escape is from area 3.a to area 3.b, then to area 2.b and to area 2d, and finally to area 2.d. The escape route can be computed to optimize the fastest route to a safety area, or the fastest time to an exit. In some cases, route computation is based on a static escape route plan which is defined as a result of the risk assessment (e.g., what if scenarios). Based on a risk event location, the route is displayed to the individual communication media (e.g., tablet, radio, phone that may be mounted on the individual's helmet) and the individual select the nearest route.

In some cases, the route can be computed based on captured sensor data (gas leak or fire) that is mapped to the facility floor plan. By superimposing the GPS location of the individual to the sensor data, an escape routed is identified and communicated to the person communication media (e.g., tablet, radio, phone that may be mounted on the individual's helmet) and the individual select the nearest route. As the individual progresses along the way, the routing information may be updated, for example, when the individual misses a turn, a better route emerges, or a new emergency occurs.

In various implementations, the escape route may be based on an algorithm with streams of input from multiple sensors. The sensor input can originate from body held sensing that could provide information about individual wearing the PPE (personal protective equipment) such as body temperature, heartbeat, perspiration rate etc. The sensor input can also come from plant instrumentation and control systems such as gas or chemical leaks, pressure spikes etc. The sensor input can also come from environmental such as wind speed and direction. The combined information is then augmented by localization information obtained from SSID (service set identifier) association throughout the plant for the most logical (e.g., fastest or closest) exit route that will insure the safety of the worker. Generally, it is preselected based on risk evaluation (e.g., in what if risk scenarios) or based on real-time sensor data correlation to the individual location, or a combination of both thus giving the individual the choice to select the suitable escape route.

Figure 4E:
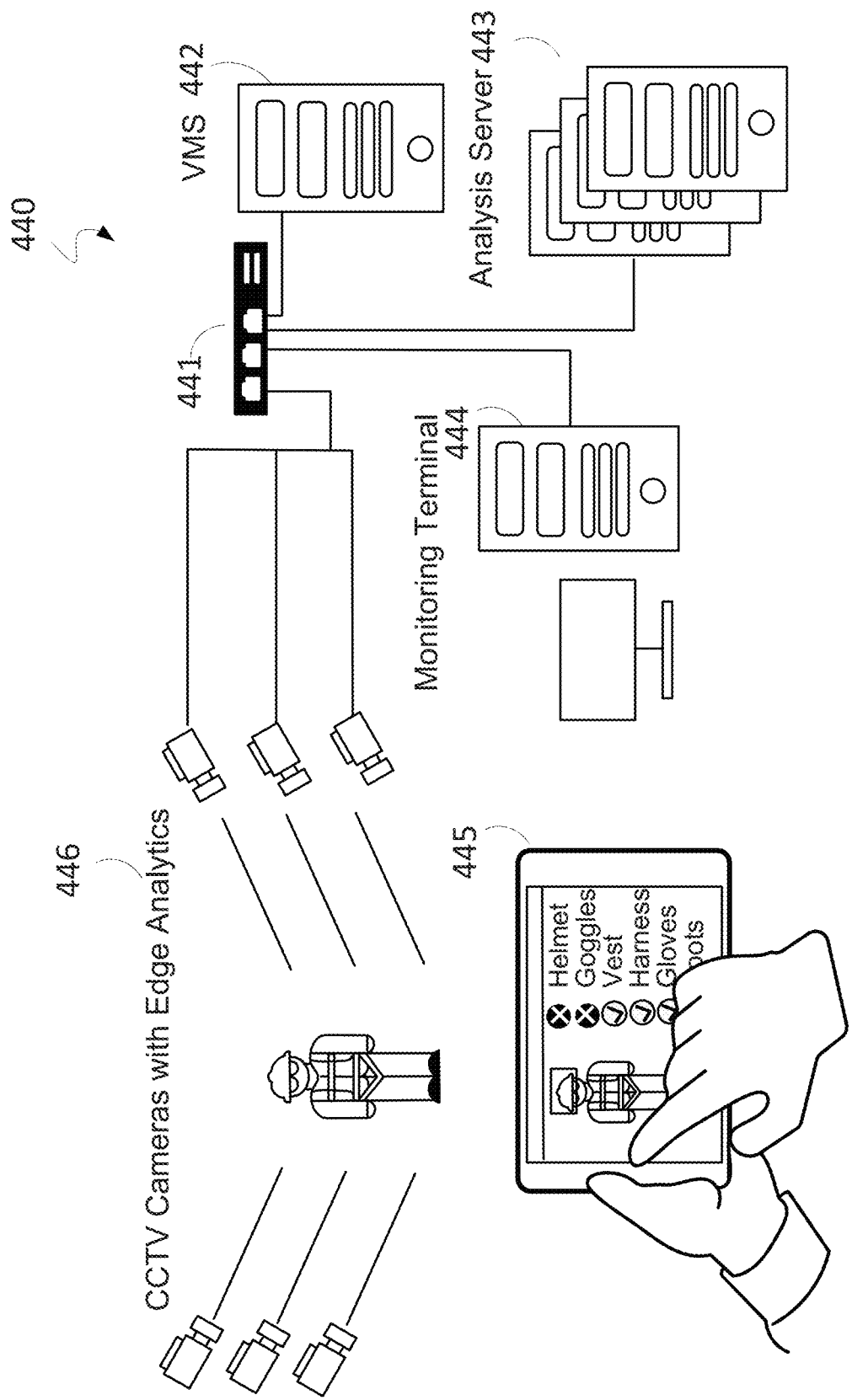

Further referring to diagram 440 from FIG. 4E, an edge analytics platform 400 is provided to generate real-time routing information. Platform 400 includes network switch 441 providing connectivity to CCTV camera sensors 446, VMS (Video Management System) 442, analytics server 443, monitoring terminal 444, as well as user tablet 445. In this example, CCTV camera sensors monitor a plant facility to provide real time video streaming. Edge analytics can be derived based on the stream input using a stand-alone computing server 443 or utilizing VMS 442. The edge data analytics is correlated to key performance indicators (KPI) dashboard (e.g., user tablet 445) to achieve accurate worker identification and tracking, zero worker violations, and zero unsafe condition. The KPIs are achieved with high accuracy with no false negatives/positives which may introduce unreliability of the analytics. The edge detection capabilities are based on mapping the individual PPE profile to the actual facility area (zone or segment). The solution provides real-time notifications when a potential safety violation is occurring that is related to workers health, unsafe behaviors and unsafe conditions. The solution is capable of gathering and integrating data from worker health conditions, meteorological conditions and related site safety requirements, as outlined above with respect to FIGS. 1A to 1C.

Figure 5:
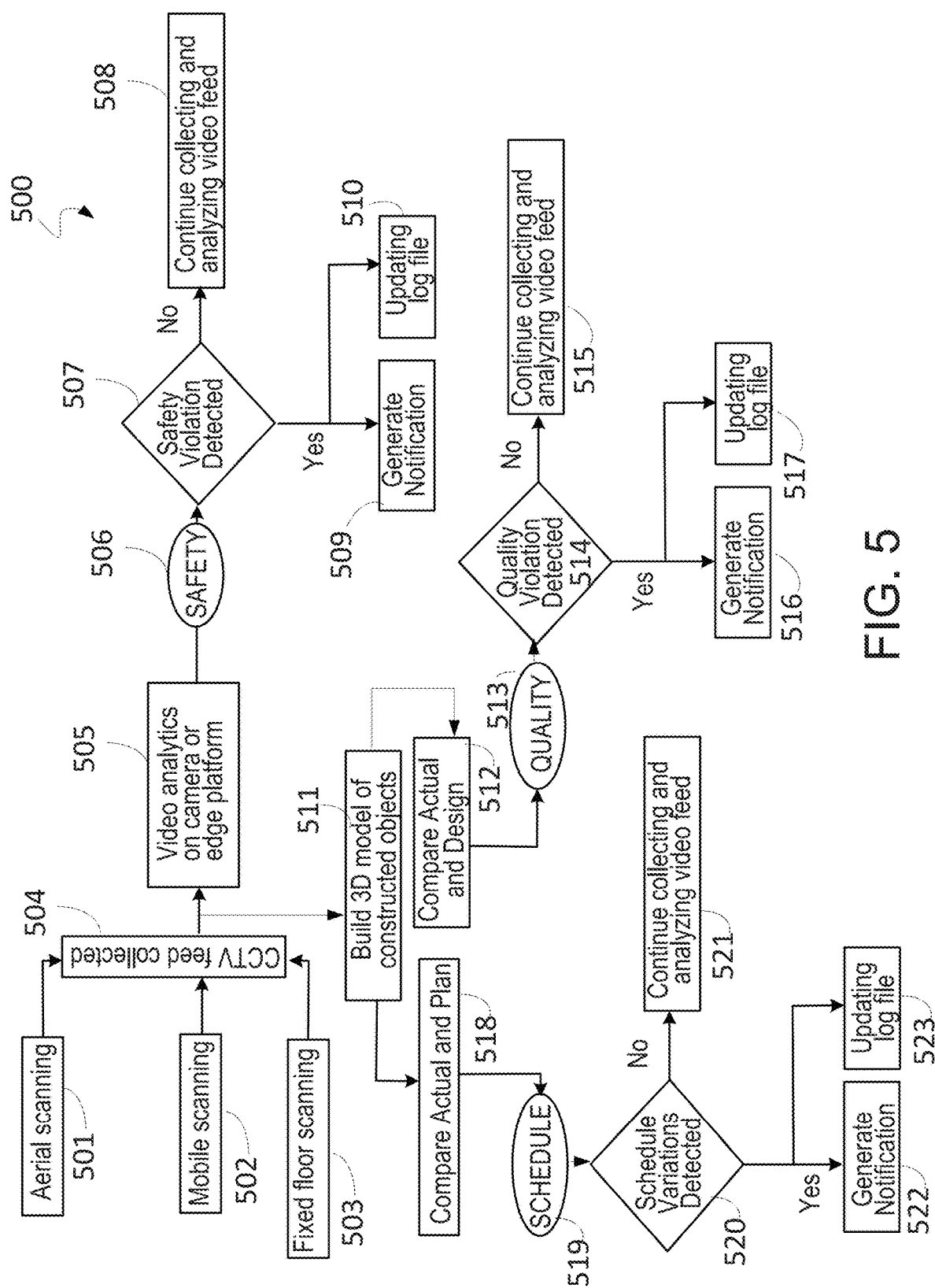
FIG. 5 illustrates an example of a flow chart according to an implementation of the present disclosure.

FIG. 5 is a flow chart 500 illustrating an example of intelligent edge analytics based on some implementations. Multiple streams of sensor input can be collected at CCTV feed (504). These streams of input can include aerial scanning (501), mobile scanning (502), and fixed floor scanning (503). Here, the use of drone will provide aerial imaging (scanning) based on scheduled and unscheduled aerial trips. Based on the image feed from cameras and edge platform, video analytics can be generated (505). The video analytics are evaluated to determine a safety status (506) of the plant operation (507). If a safety violation is detected, a notification is generated (509) and the log file is updated (510). If no safety violation is detected, the process may continue with collecting and analyzing video feed (508). Based on the image feed from cameras and edge platform, 3D models of the constructed objects can be built (511). From this 3D model, a comparison can be made between the actual construction and the planned construction (518). Based on the comparison, a schedule (519) can be inspected to determine whether schedule variations exist (520). If no variations are detected, the process may continue with collecting and analyzing the video feed (521). If variations are detected, notifications are generated (522) and a log file is updated (523). From this 3D model, a comparison can be made between the actual construction and the designed project (512). Quality metrics can be inspected to determine whether there are quality violations (514). If no quality violations are detected, the process may continue with collecting and analyzing video feed (515). If quality violations are detected, a notification is generated (516) and the log file may be updated (517).

Figure 6:
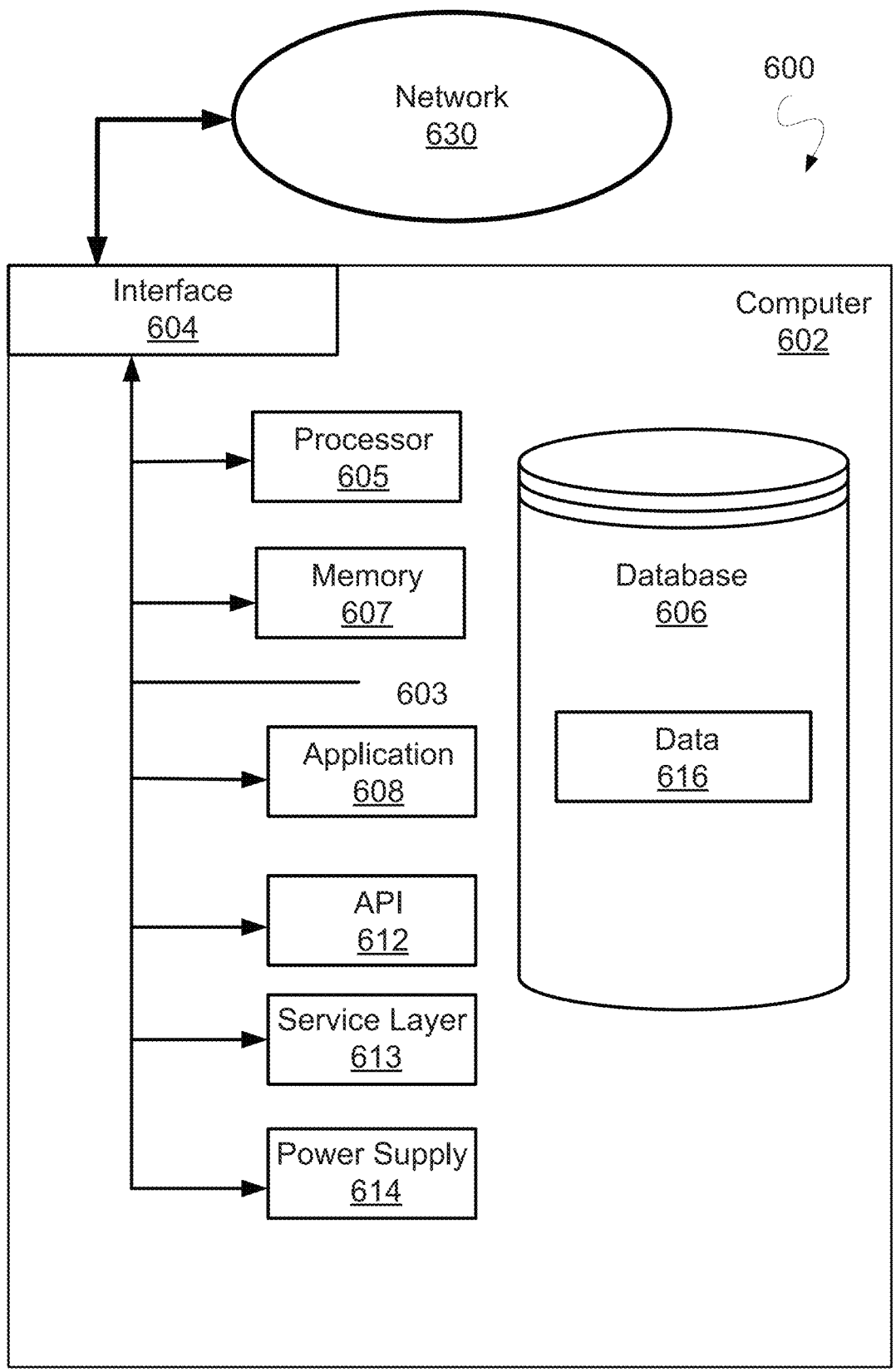
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described data 616 including, for example, multiple streams of data from various sources, such as the aerial scanning, mobile scanning, and fixed floor scanning, as explained in more detail in association with FIGS. 1A to 1C and 5.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method to manage an industrial plant facility, the method comprising:
   establishing, at a wearable device, a connection with a server computer, wherein the wearable device comprises a smart helmet and is worn by at least one operator at an industrial plant facility, and wherein the server computer is configured to analyze multiple streams of input data from a network of sensors, wherein the network of sensors comprise a first subset of sensors positioned at the industrial plant facility and a second subset of sensors worn by the at least one operator;
   receiving, at the smart helmet and from the connection, an alert when the server computer determines that an emergency has occurred inside the industrial plant facility and in proximity to the at least one operator of the industrial plant facility;
   receiving, at the smart helmet and from the connection, an escape route calculated based on, at least in part, where the emergency is occurring at the industrial plant facility as well as worker health conditions and site conditions determined from the multiple streams of input data from the network of sensors; and
   dynamically updating, at the smart helmet, the escape route to guide the at least one operator to safety as the at least one operator starts to escape from the emergency and as the emergency unfolds.

2. The computer-implemented method of claim 1, wherein the first subset of sensors comprise at least one video camera configured to perform edge detection using video data so that the at least one operator is identified on the at least one video camera while the at least operator follows the escape route.

3. The computer-implemented method of claim 1, further comprising:
   in response to the at least one operator missing a turn, receiving, at the wearable device, an updated escape route calculated based on, at least in part, an updated location of the at least one operator.

4. The computer-implemented method of claim 1, further comprising: in response to a new escape route emerging, receiving, at the wearable device, the new escape route, wherein the new escape route is a faster route to safety.

5. The computer-implemented method of claim 1, wherein the alert is provided as a visual alert by the smart helmet.

6. The computer-implemented method of claim 1, wherein the alert is provided as an audio alert by the smart helmet.

7. The computer-implemented method of claim 1, wherein the multiple streams of input data from the network of sensors originate from at least one of: an aerial scanning at the industrial plant facility, a mobile scanning at the industrial plant facility, and a floor scanning at the industrial plant facility,
   wherein the aerial scanning comprises: operating one or more surveillance drones to monitor the industrial plant facility,
   wherein the mobile scanning comprises: operating one or more moveable sensors to monitor the industrial plant facility, and
   wherein the floor scanning comprises: operating one or more fixed sensors to monitor the industrial plant facility.

8. A computer system comprising a wearable device worn by at least one operator at an industrial plant facility, wherein the wearable device comprises at least one computer processor configured to perform operations of:
   establishing, at a wearable device, a connection with a server computer, wherein the wearable device comprises a smart helmet and is worn by at least one operator at an industrial plant facility, and wherein the server computer is configured to analyze multiple streams of input data from a network of sensors, wherein the network of sensors comprise a first subset of sensors positioned at the industrial plant facility and a second subset of sensors worn by the at least one operator;
   receiving, at the smart helmet and from the connection, an alert when the server computer determines that an emergency has occurred inside the industrial plant facility and in proximity to the at least one operator of the industrial plant facility;
   receiving, at the smart helmet and from the connection, an escape route calculated based on, at least in part, where the emergency is occurring at the industrial plant facility as well as worker health conditions and site conditions determined from the multiple streams of input data from the network of sensors; and
   dynamically updating, at the smart helmet, the escape route to guide the at least one operator to safety as the at least one operator starts to escape from the emergency and as the emergency unfolds.

9. The computer system of claim 8, wherein the first subset of sensors comprise at least one video camera configured to perform edge detection using video data so that the at least one operator can be identified on the at least one video camera while the at least operator follows the escape route.

10. The computer system of claim 9, wherein the operations further comprise: in response to a new escape route emerging, receiving, at the wearable device, the new escape route, wherein the new escape route is a faster route to safety.

11. The computer system of claim 8, wherein the operations further comprise:
    in response to the at least one operator missing a turn, receiving, at the wearable device, an updated escape route calculated based on, at least in part, an updated location of the at least one operator.

12. The computer system of claim 8, wherein the alert is provided as a visual alert by the smart helmet.

13. The computer system of claim 8, wherein the alert is provided as an audio alert by the smart helmet.

14. The computer system of claim 8, wherein the multiple streams of input data from the network of sensors originate from at least one of: an aerial scanning at the industrial plant facility, a mobile scanning at the industrial plant facility, and a floor scanning at the industrial plant facility,
- wherein the aerial scanning comprises: operating one or more surveillance drones to monitor the industrial plant facility,
- wherein the mobile scanning comprises: operating one or more moveable sensors to monitor the industrial plant facility, and
- wherein the floor scanning comprises: operating one or more fixed sensors to monitor the industrial plant facility.

15. A non-volatile computer readable medium comprising software instructions, which, when executed by a computer processor of a wearable device, cause the computer processor to perform operations comprising:
- establishing, at the wearable device, a connection with a server computer, wherein the wearable device comprises a smart helmet and is worn by at least one operator at an industrial plant facility, and wherein the server computer is configured to analyze multiple streams of input data from a network of sensors, wherein the network of sensors comprise a first subset of sensors positioned at the industrial plant facility and a second subset of sensors worn by the at least one operator;
- receiving, at the smart helmet and from the connection, an alert when the server computer determines that an emergency has occurred inside the industrial plant facility and in proximity to the at least one operator of the industrial plant facility;
- receiving, at the smart helmet and from the connection, an escape route calculated based on, at least in part, where the emergency is occurring at the industrial plant facility as well as worker health conditions and site conditions determined from the multiple streams of input data from the network of sensors; and
- dynamically updating, at the smart helmet, the escape route to guide to guide the at least one operator to safety as the at least one operator starts to escape from the emergency and as the emergency unfolds.

16. The non-volatile computer readable medium of claim 15, wherein the first subset of sensors comprise at least one video camera configured to perform edge detection using video data so that the at least one operator can be identified on the at least one video camera while the at least operator follows the escape route.

17. The non-volatile computer readable medium of claim 15, wherein the operations further comprise:
- in response to the at least one operator missing a turn, receiving, at the wearable device, an updated escape route calculated based on, at least in part, an updated location of the at least one operator.

18. The non-volatile computer readable medium of claim 15, wherein the operations further comprise: in response to a new escape route emerging, receiving, at the wearable device, the new escape route, wherein the new escape route is a faster route to safety.

19. The non-volatile computer readable medium of claim 15, wherein the alert is provided by the smart helmet as at least one of: a visual alert, or an audio alert.

20. The non-volatile computer readable medium of claim 15, wherein the multiple streams of input data from the network of sensors originate from at least one of: an aerial scanning at the industrial plant facility, a mobile scanning at the industrial plant facility, and a floor scanning at the industrial plant facility,
- wherein the aerial scanning comprises: operating one or more surveillance drones to monitor the industrial plant facility,
- wherein the mobile scanning comprises: operating one or more moveable sensors to monitor the industrial plant facility, and
- wherein the floor scanning comprises: operating one or more fixed sensors to monitor the industrial plant facility.

* * * * *

UNITED STATES PATENT AND TRADEMARK OFFICE
CERTIFICATE OF CORRECTION

| | |
|---|---|
| PATENT NO. | : 11,881,094 B2 |
| APPLICATION NO. | : 17/728184 |
| DATED | : January 23, 2024 |
| INVENTOR(S) | : Bander R. Al-Yousef et al. |

It is certified that error appears in the above-identified patent and that said Letters Patent is hereby corrected as shown below:

In the Claims

In Column 19, Line 56, Claim 2, please replace "operator" with -- one operator --

In Column 20, Line 55, Claim 9, please replace "operator" with -- one operator --

In Column 22, Line 4, Claim 15, please replace "to guide to guide" with -- to guide --

In Column 22, Line 11, Claim 16, please replace "operator" with -- one operator --

Signed and Sealed this
Twenty-third Day of April, 2024

Katherine Kelly Vidal
*Director of the United States Patent and Trademark Office*